United States Patent
Hu

(10) Patent No.: US 11,546,746 B2
(45) Date of Patent: Jan. 3, 2023

(54) METHOD, DEVICE, AND SYSTEM FOR CONTROLLING A BLUETOOTH DEVICE OVER A BLUETOOTH MESH NETWORK

(71) Applicant: Alibaba Group Holding Limited, George Town (KY)

(72) Inventor: Junfeng Hu, Hangzhou (CN)

(73) Assignee: Alibaba Group Holding Limited

( * ) Notice: Subject to any disclaimer, the term of this patent is extended or adjusted under 35 U.S.C. 154(b) by 0 days.

(21) Appl. No.: 16/653,112

(22) Filed: Oct. 15, 2019

(65) Prior Publication Data
US 2020/0169861 A1 May 28, 2020

(30) Foreign Application Priority Data
Oct. 17, 2018 (CN) .......................... 201811209707.8

(51) Int. Cl.
| | |
|---|---|
| G06F 3/16 | (2006.01) |
| H04W 4/80 | (2018.01) |
| H04W 88/16 | (2009.01) |
| G10L 15/26 | (2006.01) |
| H04W 84/18 | (2009.01) |

(52) U.S. Cl.
CPC .............. *H04W 4/80* (2018.02); *G10L 15/26* (2013.01); *H04W 88/16* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 7,136,709 | B2 | 11/2006 | Arling |
| 9,924,342 | B2 | 3/2018 | Logue |
| 10,002,524 | B2 | 6/2018 | Shim |
| 10,111,071 | B2 | 10/2018 | Polo |
| 10,158,536 | B2 | 12/2018 | Kim |
| 2002/0045424 | A1 | 4/2002 | Lee |
| 2008/0151824 | A1 | 6/2008 | Shorty |
| 2011/0210816 | A1 | 9/2011 | Wang |

(Continued)

FOREIGN PATENT DOCUMENTS

| | | |
|---|---|---|
| CN | 104898449 | 9/2015 |
| CN | 105867145 | 8/2016 |

(Continued)

*Primary Examiner* — Gary Lafontant
(74) *Attorney, Agent, or Firm* — Van Pelt, Yi & James LLP

(57) ABSTRACT

The present application discloses methods, devices, and a system for controlling a Bluetooth device connected to a Bluetooth mesh network. A method includes receiving, by one or more processors associated with a server connected to a Bluetooth mesh network, a control request, wherein the control request is sent to the server by at least one Bluetooth gateway, and the at least one Bluetooth gateway is connected to the Bluetooth mesh network that received the control request sent by a user, and the control request corresponds to a request to control a to-be-controlled Bluetooth device, and controlling, by one or more processors, the to-be-controlled Bluetooth device via at least one Bluetooth gateway among a plurality of Bluetooth gateways connected to the Bluetooth mesh network, the to-be-controlled Bluetooth device being controlled based at least in part on the control request.

22 Claims, 6 Drawing Sheets

(56) References Cited

U.S. PATENT DOCUMENTS

| | | | |
|---|---|---|---|
| 2012/0057518 A1* | 3/2012 | Errala | H04W 84/20 370/315 |
| 2013/0294285 A1 | 11/2013 | Zhang et al. | |
| 2015/0169382 A1* | 6/2015 | Anderson | G06F 9/5094 718/104 |
| 2015/0271808 A1* | 9/2015 | Liang | H04L 69/14 370/329 |
| 2016/0014549 A1 | 1/2016 | Jones | |
| 2016/0040903 A1 | 2/2016 | Emmons et al. | |
| 2016/0323012 A1 | 11/2016 | Kwon et al. | |
| 2017/0064042 A1 | 3/2017 | Vora et al. | |
| 2018/0213349 A1 | 7/2018 | Panje | |
| 2019/0245716 A1* | 8/2019 | Coombes | H04W 40/12 |
| 2020/0257495 A1* | 8/2020 | Chen | H04L 67/025 |

FOREIGN PATENT DOCUMENTS

| | | |
|---|---|---|
| CN | 106357525 | 1/2017 |
| CN | 106993278 | 7/2017 |
| CN | 107393069 | 11/2017 |
| CN | 108231072 | 6/2018 |

\* cited by examiner

METHOD, DEVICE, AND SYSTEM FOR CONTROLLING A BLUETOOTH DEVICE OVER A BLUETOOTH MESH NETWORK

CROSS REFERENCE TO OTHER APPLICATIONS

This application claims priority to People's Republic of China Patent Application No. 201811209707.8 entitled BLUETOOTH MESH NETWORK AND COMMUNICATION METHOD, DEVICE, AND STORAGE MEDIUM THEREOF filed Oct. 17, 2018 which is incorporated herein by reference for all purposes.

FIELD OF THE INVENTION

The present application relates to a field of wireless communication technology. In particular, the present application relates to a Bluetooth mesh network and a method, device, and storage medium thereof.

BACKGROUND OF THE INVENTION

Short-distance wireless communication technology is now widely applied in smart control, security, and other application contexts. For example, Bluetooth mesh technology, promulgated by the Bluetooth Special Interest Group, is a Bluetooth profile established on the Bluetooth Low Energy (BLE) standard whereby Bluetooth mesh networks can be implemented.

Existing Bluetooth mesh networks include two main roles: a provisioner role and a device to be provisioned role. The device to be provisioned is a Bluetooth device (e.g., a device configured to communicate in accordance with Bluetooth communication technology). To ensure the security of a Bluetooth mesh network, Bluetooth devices are added to the Bluetooth mesh network and provisioned by a provisioner. In a Bluetooth mesh network, Bluetooth devices can communicate with the provisioner only if the Bluetooth devices are located within the signal coverage range of the provisioner. Bluetooth devices are therefore able to communicate with the provisioner only if the Bluetooth devices are located within the signal coverage of the provisioner. This restriction limits the provisioning coverage range of a Bluetooth mesh network and affects the development of Bluetooth mesh technology.

BRIEF DESCRIPTION OF THE DRAWINGS

Various embodiments of the invention are disclosed in the following detailed description and the accompanying drawings.

The drawings described here are intended to further the understanding of the present application and form a part of the present application. The illustrative embodiments of the present application and the descriptions thereof are intended to explain the present application and do not constitute inappropriate limitation to the present application. Among the drawings.

DETAILED DESCRIPTION

Figure 1:
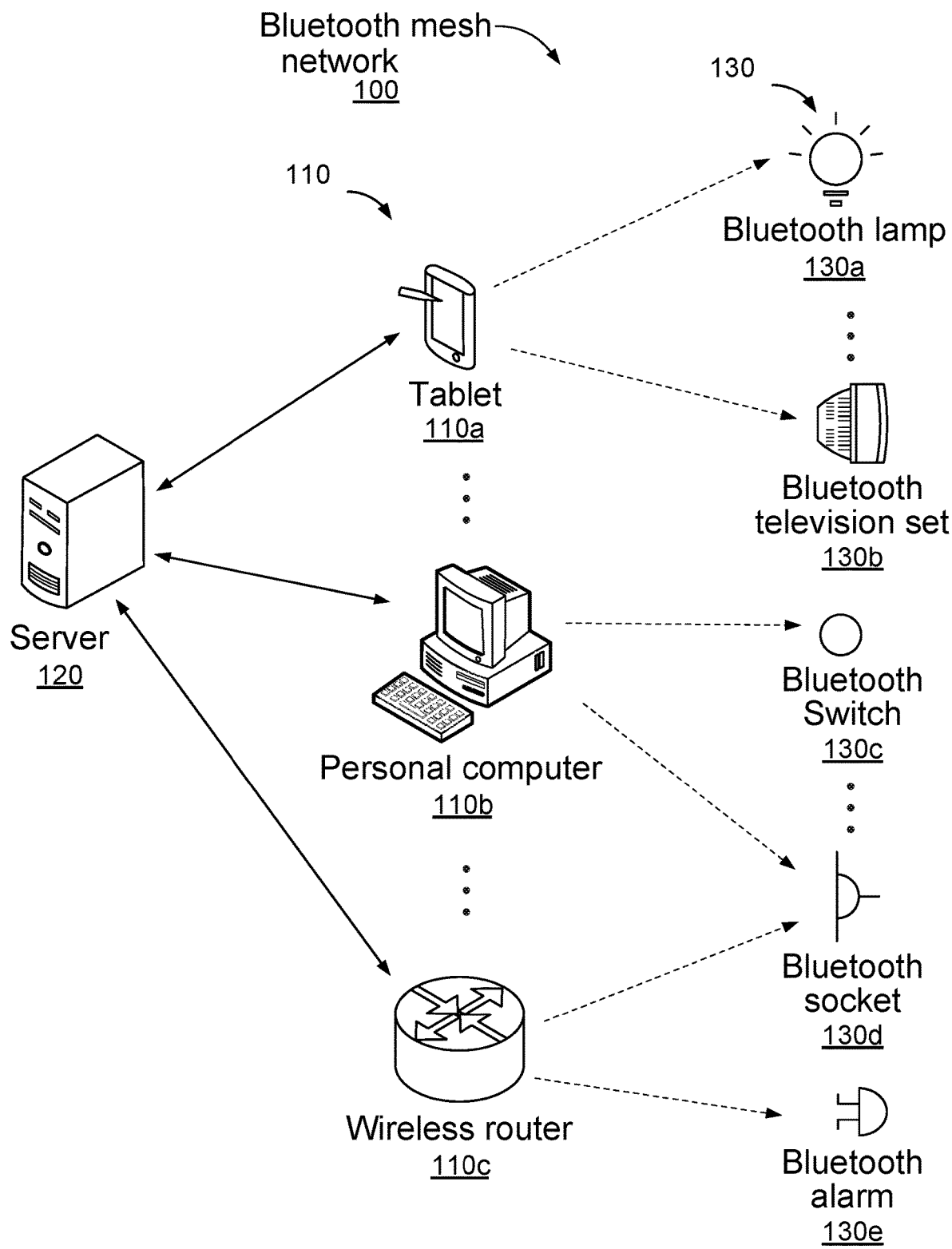
FIG. 1 is a diagram of a Bluetooth mesh network according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

So as to further clarify the objectives, technical schemes, and advantages of the present application, technical schemes of the present application are described clearly and completely below in light of specific embodiments and corresponding drawings of the present application. Obviously, the described embodiments are merely some of the embodiments of the present application and not all the embodiments. So long as no additional creative effort is expended, all other embodiments that are obtained by persons with ordinary skill in the art on the basis of embodiments in the present application fall within the scope of protection of the present application.

As used herein, a "terminal" generally refers to a device comprising one or more processors. A terminal can be a device used (e.g., by a user) within a network system and used to communicate with one or more servers. According to various embodiments of the present disclosure, a terminal includes components that support communication functionality. For example, a terminal can be a smart phone, a server, a machine of shared power banks, information centers (such as one or more services providing information such as traffic or weather, etc.), a tablet device, a mobile phone, a video phone, an e-book reader, a desktop computer, a laptop computer, a netbook computer, a personal computer, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), a kiosk such as a vending machine, a smart home appliance, vehicle-mounted mobile stations, or the like. A terminal can run various operating systems.

As used herein, a "Bluetooth device" or "Bluetooth terminal" generally refers to a terminal that is configured to communicate in accordance with Bluetooth communication technology (e.g., Bluetooth Low Energy (LE)), or a short-distance wireless communication device.

Existing Bluetooth mesh networks have various limitations, including the constraints on provisioning coverage range (e.g., a limitation on the range within which a Bluetooth device needs to be in relative to a provisioner in order to be provisioned in connection with the Bluetooth device being added to a Bluetooth mesh network). Provisioning a device includes a process of adding a device to a specified Bluetooth mesh network. The provisioning of a device turns the device into a node on the Bluetooth mesh network. In some embodiments, the provisioning of the device includes security key distribution and the creation of a unique ID for the device being added.

Various embodiments address technical problems of existing Bluetooth mesh networks (e.g., the constraints on provisioning coverage range). Various embodiments include a Bluetooth mesh network comprising a plurality of Bluetooth gateways and a server. The Bluetooth mesh network supports many-to-many (m:m) device communications.

According to various embodiments, a control request with respect to a device to be controlled (e.g., a Bluetooth device) in the context of a Bluetooth mesh network is submitted to the server in the Bluetooth mesh network. The control request can include information that identifies the device to be controlled. For example, the control request can include an identifier of the device to be controlled. The control request can be input by a user or generated in response to an input by the user. For example, the control request can be input to a Bluetooth device connected to the Bluetooth mesh network. The Bluetooth device to which the control request is input is provided (e.g., communicated to the server). In response to obtaining the control request, the server selects a Bluetooth gateway (e.g., from among the plurality of Bluetooth gateways included in the Bluetooth mesh network) to correspond to the control request. For example, the server selects the Bluetooth gateway that is to implement control over the device to be controlled. The Bluetooth gateway that is to implement control over the device to be controlled can be selected based at least in part on signal strength, resources of the gateway, compatibility of the gateway, etc. Various embodiments solve a communication problem of Bluetooth mesh networks that comprise a plurality of Bluetooth gateways. In contrast, some related art have problems associated with network conflicts in contexts for which a Bluetooth mesh network has a plurality of gateways. In such Bluetooth mesh networks according to the related art, it is unclear as to which gateway will implement control over a particular device. Accordingly, various embodiments can implement a Bluetooth mesh network that includes a plurality of Bluetooth gateways. A Bluetooth mesh network that comprises a plurality of Bluetooth gateways has a relatively greater coverage region (e.g., area within which Bluetooth communications are carried out, an area within which a Bluetooth device can be controlled, etc.) than a Bluetooth mesh network that comprises a single Bluetooth gateway. In some embodiments, the use of a plurality of Bluetooth gateways can extend a Bluetooth mesh network to a relatively greater number of Bluetooth devices than a Bluetooth mesh network having a single Bluetooth gateway. As an example, the use of a plurality of Bluetooth gateways in a Bluetooth mesh network can improve (e.g., solve) the problem associated with communication dead spots caused by constraints on the Bluetooth mesh network coverage range.

FIG. 1 is a diagram of a Bluetooth mesh network according to various embodiments of the present application.

Referring to FIG. 1, Bluetooth mesh network 100 is provided. Bluetooth mesh network 100 can be implemented in connection with Bluetooth mesh network 200 of FIG. 2. Bluetooth mesh network 100 can be implemented in connection with process 300 of FIG. 3, process 400 of FIG. 4, and/or process 500 of FIG. 5. At least part of Bluetooth mesh network 100 can be implemented at least in part by computer system 600 of FIG. 6.

Bluetooth mesh network 100 includes a plurality of Bluetooth gateways 110 (e.g., 110*a*, 110*b*, and 110*c*) and a server 120. In some embodiments, Bluetooth mesh network 100 includes one or more Bluetooth devices 130 (e.g., 130*a*, 130*b*, 130*c*, etc.). According to various embodiments, Bluetooth mesh network 100 includes a provisioner. The provisioner can be implemented by at least one of the plurality of Bluetooth gateways 110, one of the one or more Bluetooth devices 130, and/or server 120.

According to various embodiments, the provisioner in the Bluetooth mesh network 100 is configured to add Bluetooth devices to Bluetooth mesh network 100. The provisioner adds a Bluetooth device to Bluetooth mesh network 100 by provisioning the Bluetooth device. Provisioning a device includes a process of adding a device to a specified Bluetooth mesh network.

The plurality of Bluetooth devices 130 (e.g., 130*a*, 130*b*, and 130*c*, etc.) of Bluetooth mesh network 100 are already connected to Bluetooth mesh network 100. Additional Bluetooth devices can be added to Bluetooth mesh network 100. According to various embodiments, control can be exerted on one or more of the plurality of Bluetooth devices 130. For example, if a Bluetooth device is connected to a Bluetooth mesh network, the Bluetooth device can be controlled by one or more other terminals on the Bluetooth mesh network (e.g., by a server, a gateway in the Bluetooth mesh network, or another Bluetooth device connected to the Bluetooth mesh network). To exert control on a Bluetooth device 130 comprises causing the particular one of the plurality of Bluetooth devices 130 to perform one or more functions. For example, an instruction (e.g., a command) can be communicated to the particular one of the plurality of Bluetooth devices 130 (e.g., over the Bluetooth mesh network 100) over which control is to be exerted. The instruction can be an instruction to turn on a light (e.g., a light associated with the Bluetooth device). In response to receiving the instruction, the particular one of the plurality of Bluetooth devices 130 performs the one of more functions included (or identified) in the instruction. The instruction can include an instruction for turning on or activating the particular one of the plurality of Bluetooth devices 130, an instruction for changing one or more settings of one or more of the plurality of Bluetooth devices 130 (e.g., volume control, song selection for playback, temperature settings, etc.), etc.

The plurality of Bluetooth gateways 110 are connected to the server 120. In some embodiments, one or more of the plurality of Bluetooth gateways 110 are communicatively connected to the server 120 via a non-Bluetooth communication mode. As an example, one or more of the plurality of Bluetooth gateways 110 connect to the server via communication connections that correspond to a wired connection (e.g., a LAN connection), or a wireless connection (e.g., Wi-Fi, infrared, a cellular network, etc.). The communication distance of the connection between the one or more of the plurality of Bluetooth gateways 110 and the server 120 that are connected via a non-Bluetooth communication mode is greater than a communication distance of the Bluetooth communication mode (e.g., the one or more of the plurality of Bluetooth gateways 110 connected via a non-Bluetooth communication mode can be located at a further distance from the server 120 than a Bluetooth gateway 110 that is connected to the server 120 via a Bluetooth connection). Because the communication distance of the non-Bluetooth communication mode is usually greater than the communication distance of the Bluetooth communication mode, the longer communication distances between the one or more of the plurality of Bluetooth gateways 110 connected via the non-Bluetooth communication mode and the server 120 can supplement and extend the communication distances among the plurality of Bluetooth gateways 110. For example, the use of a non-Bluetooth connection mode to connect at least one Bluetooth gateway 110 can enable a more scattered distribution of the plurality of Bluetooth gateways 110 or increase the distance between any two of the plurality of Bluetooth gateways 110 while allowing the plurality of Bluetooth gateways 110 to remain deployed within the same Bluetooth mesh network 100. In other words, mutual support between the Bluetooth communication mode and the non-Bluetooth communication mode effectively expands the coverage range of the Bluetooth mesh network 100 while avoiding the occurrence of communication dead spots (e.g., areas within which a Bluetooth device is unable to connect or communicate with the Bluetooth mesh network 100 or within which a connection between a Bluetooth device and the Bluetooth mesh network 100 is below a threshold value or quality of service).

In some embodiments, the server 120 is deployed remotely from the one or more Bluetooth devices 130 and/or the plurality of Bluetooth gateways 110. For example, the server 120 is deployed on a cloud, and one or more of the plurality of Bluetooth gateways 110 are configured access to the Internet (e.g., wide-area network or metropolitan-area network) via Wi-Fi, Ethernet, fiber optics, or a 2/3/4G/5G or other mobile network. The one or more of the plurality of Bluetooth gateways 110 establish communicative connections with the server 120 via the Internet and establish and conduct two-way communications with the server 120.

According to various embodiments, one or more of the plurality of Bluetooth gateways 110 are computer devices that support Bluetooth technology, have Bluetooth detection functions, and are configured to process information or one or more functions. For example, the plurality of Bluetooth gateways 110 include one or more of a wireless router, a smart phone, a tablet, a personal computer, a Bluetooth probe, and other devices that support Bluetooth communication technology. Various other terminals can be implemented as a Bluetooth gateway. In some embodiments, the Bluetooth gateway 110 enables one or more Bluetooth devices to communicate with the server 120 of the Bluetooth mesh network 100. For example, a Bluetooth device 130 that is connected to a Bluetooth gateway 110 can communicate with the server 120 via the Bluetooth gateway 110.

According to various embodiments, a Bluetooth gateway 110 includes at least one processing unit, at least one memory device, and a Bluetooth communication module. A Bluetooth gateway 110 can include one or more processing units and/or one or more memory devices. The number of processing units and/or and memory devices implemented in a Bluetooth gateway can be dependent on the configuration of the Bluetooth gateway 110 and/or a type of device corresponding to the Bluetooth gateway 110. The memory device(s) of the Bluetooth gateway 110 can correspond to a volatile memory, such as RAM, or a non-volatile memory, such as read-only memory (ROM) or flash memory, or include both a volatile memory and a non-volatile memory. The memory device(s) generally store an operating system (OS) and one or more applications. The memory device(s) can also store program data. In addition to processing units, memory device(s), and Bluetooth communication modules, Bluetooth gateways 110 can include configurations such as other types of network card chips, I/O buses, and audiovisual components. In some embodiments, Bluetooth gateways 110 include one or more peripheral devices such as keyboards, mice, styluses, printers, displays, electronic screens, etc.

The server 120 can be a conventional server, a cloud server, a cloud host, a virtual center, or other server equipment. The server 120 includes one or more processors, one or more hard drives, memory, and one or more system buses. In some embodiments, the architecture of the server 120 is similar to that of general-purpose computers.

According to various embodiments, a Bluetooth device 130 is a device (e.g., terminal) that supports Bluetooth communication technology and that can connect to the Bluetooth mesh network 100. For example, a Bluetooth device 130 can be a Bluetooth lamp, a Bluetooth switch, a Bluetooth socket, a Bluetooth television set, Bluetooth earphones, a Bluetooth sound system, a Bluetooth keyboard, a Bluetooth bracelet, a Bluetooth alarm, a Bluetooth tracker, a Bluetooth ear thermometer, a Bluetooth heart rate monitor, a Bluetooth watch, a Bluetooth fitness monitor, a Bluetooth mouse, a Bluetooth necklace, a Bluetooth electronic accessory, a Bluetooth medical device, a Bluetooth sensor, etc.

According to various embodiments, a Bluetooth gateway 110 receives a control request (e.g., from a user). The control request can be input to the Bluetooth gateway 110 via a peripheral device or another input interface (e.g., a keyboard, a touch screen, a voice command via a microphone, etc.), and the Bluetooth gateway 110 can receive the control request via a Bluetooth device 130 connected to the Bluetooth gateway 110 or connected to the Bluetooth mesh network 100 to which the Bluetooth gateway 110 is connected. In response to receiving the control request, the Bluetooth gateway 110 communicates (e.g., sends) the control request, or information obtained from the control request, to the server 120 (e.g., the server connected to the same Bluetooth mesh network 100 as the Bluetooth gateway 110). In some embodiments, the control request corresponds to a request to control a Bluetooth device 130 (e.g., a to-be-controlled Bluetooth device). The control request can comprise information that identifies the to-be-controlled Bluetooth device (e.g., an identifier of the to-be-controlled Bluetooth device such as a media access control (MAC) address, an International Mobile Equipment Identity (IMEI), an Internet Protocol (IP address), an address of the Bluetooth device with respect to the Bluetooth mesh network 100, etc.). One or more of the plurality of Bluetooth gateways 110 can be configured to receive a control request sent by a user for a to-be-controlled Bluetooth device and, upon receiving this control request, send the control request (or information obtained from the control request) to the server 120. The server 120 receives the control request (or information obtained from the control request and sent to the server from the one or more of the plurality of Bluetooth gateways 110). In response to receiving the control request (or information obtained from the control request), the server 120 performs one or more functions. For example, in response to receiving the control request, the server 120 exercises the appropriate control based on the control request over the to-be-controlled Bluetooth device via at least one Bluetooth gateway among the plurality of Bluetooth gateways 110. The to-be-controlled Bluetooth device is one of the one or more Bluetooth devices 130. In some embodiments, the server 120 can select the Bluetooth device 130 that is to be controlled based at least in part on the control request. For example, the server 120 can select the Bluetooth device 130 that is to be controlled based at least in part on a type of the control request or a type of function to be performed in connection with the control request. In some embodiments, the server 120 determines the Bluetooth device 130 that is to be controlled based at least in part on identifying information comprised in the control request (e.g., an identifier of the Bluetooth device 130 that is to be controlled). In some embodiments, the server 120 determines the Bluetooth device 130 that is to be controlled based at least in part on the control request, and/or determines one or more of the plurality of Bluetooth gateways 110 via which the server 120 is to communicate with the Bluetooth device 130 that is to be controlled. The server 120 can determine the one or more of the plurality of Bluetooth gateways 110 via which the server 120 is to communicate with the Bluetooth device 130 that is to be controlled based at least in part on the control request or the Bluetooth device 130 that is to be controlled.

According to various embodiments, in Bluetooth mesh network 100, a control request (e.g., a user's control request) is provided to the server 120. The server 120 selects one or more of the plurality of Bluetooth gateways 110 to be used in connection with implementing control over the to-be-controlled Bluetooth device with respect to the control request. The selection of a Bluetooth gateway 110 to be used (e.g., to be communicated with) in connection with implementing control over a Bluetooth device 130 connected to the Bluetooth mesh network 100 addresses a communication problem in Bluetooth mesh networks comprising multiple Bluetooth gateways 110. Accordingly, a Bluetooth mesh network 100 can be implemented in a manner according to which the Bluetooth mesh network 100 comprises a plurality of Bluetooth gateways 110. The use of a plurality of Bluetooth gateways 110 can therefore cover a greater number of Bluetooth devices 130. For example, the use of a plurality of Bluetooth gateways 110 within a Bluetooth mesh network 100 extends the Bluetooth mesh network to a greater number of Bluetooth devices 130 than would be possible in a Bluetooth mesh network including a single Bluetooth gateway 110. Accordingly, various embodiments improve the problems associated with communication dead spots caused by constraints on a coverage range of a Bluetooth mesh network 100 (e.g., a Bluetooth mesh network 100 with a plurality of Bluetooth gateways 110 has a larger coverage range than a Bluetooth mesh network with a single Bluetooth gateway).

Figure 2:
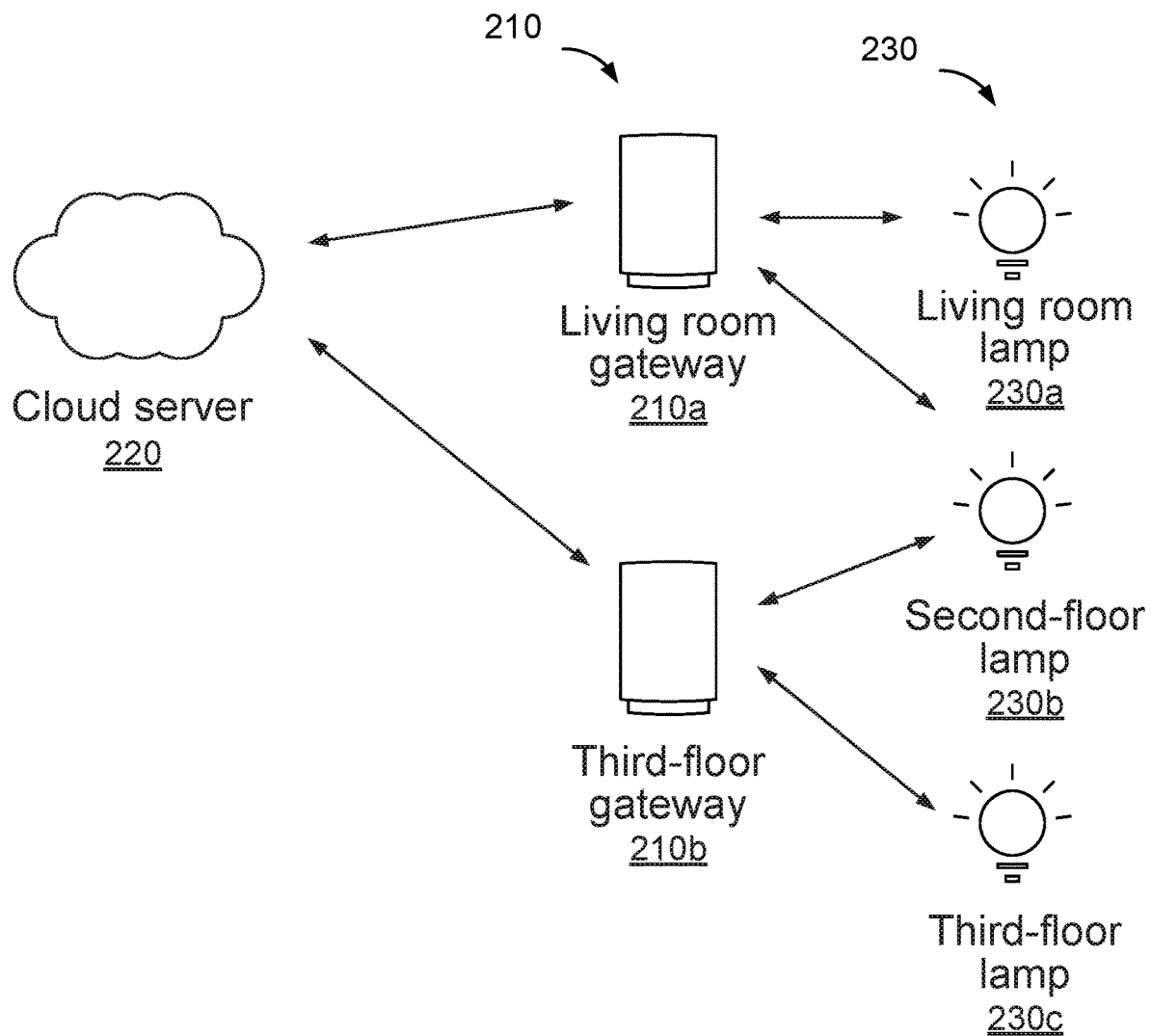
FIG. 2 is a diagram of a Bluetooth mesh network in a specific application context according to various embodiments of the present application.

FIG. 2 is a diagram of a Bluetooth mesh network in a specific application context according to various embodiments of the present application.

Referring to FIG. 2, Bluetooth mesh network 200 is provided. Bluetooth mesh network 200 can be implemented in connection with Bluetooth mesh network 100 of FIG. 1. Bluetooth mesh network 200 can be implemented in connection with process 300 of FIG. 3, process 400 of FIG. 4, and process 500 of FIG. 5. At least part of Bluetooth mesh network 200 can be implemented at least in part by computer system 600 of FIG. 6.

Bluetooth mesh network 200 includes a plurality of Bluetooth gateways 210 (e.g., living room gateway 210a, third-floor gateway 210b, etc.) and a server 220 (e.g., a cloud server). In some embodiments, Bluetooth mesh network 200 includes one or more Bluetooth devices 230 (e.g., a living room lamp 230a, a second-floor lamp 230b, a third-floor lamp 230c, etc.). According to various embodiments, Bluetooth mesh network 200 includes a provisioner. The provisioner can be implemented by at least one of the plurality of Bluetooth gateways 210, one of the one or more Bluetooth devices 230, and/or server 220.

In some embodiments, Bluetooth mesh network 200 is deployed in a residence. The range of the residence (e.g., the area of the residence) can be greater than a range of any one Bluetooth gateway 210. The use of a plurality of Bluetooth gateways 210 can extend the coverage range of the Bluetooth mesh network 200 across a greater area of the residence. For example, Bluetooth mesh network 200 is deployed in a three-story family residence. The living room of the family residence is on the first floor. A living room gateway 210a (primary Bluetooth gateway) and a living room lamp 230a are positioned in the living room. Bluetooth mesh network 200 includes a second-floor lamp 230b on the second floor and a third-floor gateway 210b (e.g., secondary Bluetooth gateway) and a third-floor lamp 230c on the third floor. The second-floor lamp 230b is near (e.g., within a threshold distance or within a communication range of a threshold of a quality service) both the living room gateway 210a and the third-floor gateway 210b. The living room gateway 210a and the third-floor gateway 210b are separately connected via a Wi-Fi network to a server 220 located on the cloud. In some embodiments, the living room gateway 210a and the third-floor gateway 210b are access points for Bluetooth devices 230 to access the internet and/or server 220. According to various embodiments, the living room lamp 230a, the second-floor lamp 230b, and the third-floor lamp 230c are all Bluetooth devices that support Bluetooth communication technology. The living room lamp 230a, the second-floor lamp 230b, and the third-floor lamp 230c can join (e.g., be provisioned with respect to) Bluetooth mesh network 200. The living room lamp 230a, the second-floor lamp 230b, and the third-floor lamp 230c can communicate (e.g., using Bluetooth communication technology) with Bluetooth mesh network 200 to communicate with server 220.

If a user in the living room issues an on/off voice request for the third-floor Bluetooth lamp 230c, the Bluetooth gateway 210b deployed on the third floor is a relatively large distance from the user. For example, Bluetooth gateway 210b is a distance from the user that is greater than a communication range of the voice command. For example, the on/off voice request issued by the user either cannot reach the third-floor gateway 210b or reaches with a rather weak signal (e.g., below a threshold quality of service, etc.). As a result, the third-floor gateway 210b cannot smoothly exercise on/off control over the third-floor Bluetooth lamp 230c. In this example, the Bluetooth gateway 210a deployed in the living room is closer to the user. Thus, the living room Bluetooth gateway 210a receives the on/off voice request (e.g., control request) from the user. In response to receiving the on/off voice request, the living room Bluetooth gateway 210a communicates (e.g., uploads) the on/off request to server 220. In response to receiving the on/off voice request (or information obtained therefrom), server 220 determines a Bluetooth device 230 to-be-controlled and/or a Bluetooth gateway 210 via which control of the Bluetooth device 230 is to be controlled. For example, server 220 uses the on/off voice request as a basis to determine that the to-be-controlled Bluetooth device is the third-floor Bluetooth lamp 230c. In response to determining that the to-be-controlled Bluetooth device is the third-floor Bluetooth lamp 230c, server 220 controls the on/off status of the third-floor Bluetooth lamp 230c via the Bluetooth gateway 210b deployed on the third floor. Thus, the user in the living room can exercise control over the third-floor Bluetooth lamp 230c and is no longer subject to the Bluetooth signal coverage range of the living room Bluetooth gateway 210a. As used in this example, the symbol "/"(e.g., on/off) means "or."

According to various embodiments, the Bluetooth gateway that is used to control the to-be-controlled Bluetooth device is a Bluetooth gateway having signal range that is capable of communicating with the to-be-controlled Bluetooth device, but is not necessarily a Bluetooth gateway that receives the control request. For example, the Bluetooth gateway that communicates with the Bluetooth device to control the Bluetooth device in accordance with a control request can be a different Bluetooth gateway than the Bluetooth gateway in which the corresponding control request is input. A server (e.g., connected to the corresponding Bluetooth mesh network) can be used to communicate control instructions or information between a Bluetooth gateway to which the control request is input and the Bluetooth device that is to be controlled based on the control request. According to various embodiments, depending on the specific circumstances (e.g., corresponding communication range of Bluetooth gateways and location of the Bluetooth devices), the Bluetooth gateway that is used to control the to-be-controlled Bluetooth device can be a Bluetooth gateway that receives the control signal, or the Bluetooth gateway that is used to control the to-be-controlled Bluetooth device can be a Bluetooth gateway that does not receive the control signal, but whose signal range is capable of communicating with (e.g., covering) the to-be-controlled Bluetooth device.

According to various embodiments, server 120 implements control over the to-be-controlled Bluetooth device 130 (e.g., causes the corresponding Bluetooth device 130 to perform one or more functions) via one or more of the plurality of the Bluetooth gateways 110 in the Bluetooth mesh network 100. In some embodiments, the server 120 communicates the received control request (or information obtained from the control request) to all of the plurality of Bluetooth gateways 110 in the Bluetooth mesh network 100. The communication of the control request to one or more of the plurality of Bluetooth gateways 110 enable the server 120 to implement control over the to-be-controlled Bluetooth device through the corresponding one or more Bluetooth gateways 110 in the Bluetooth mesh network 100. In various embodiments in which server 120 communicates the control request to the plurality of Bluetooth gateways 110 (e.g., all the Bluetooth gateways in the Bluetooth mesh network 100), server 120 is more effectively able to control the Bluetooth device 130 corresponding to the control request (e.g., a control success rate is improved). If the to-be-controlled Bluetooth device is located within the signal coverage range of multiple Bluetooth gateways 110, the to-be-controlled Bluetooth device can receive control instructions from multiple Bluetooth gateways 110. The control instructions received by the to-be-controlled Bluetooth device can be determined based at least in part on the control request. For example, the to-be-controlled Bluetooth device determines the control instructions, or the to-be-controlled Bluetooth device can receive the control instructions from the Bluetooth gateway (e.g., the control instructions can be determined by the server or the Bluetooth gateway). In some embodiments, the to-be-controlled Bluetooth device can perform a function corresponding to the control instruction and/or control request in response to receiving the first control instruction or control request from a Bluetooth gateway. For example, if a plurality of Bluetooth gateways provide the control request and/or control instruction, the to-be-controlled Bluetooth device performs the corresponding function in response to initially receiving the control instruction and/or control request. In some embodiments, the to-be-controlled Bluetooth device can perform a function corresponding to the control instruction and/or control request in response to receiving the control instruction and/or control request from a Bluetooth gateway with which the to-be-controlled Bluetooth device has a best connection (e.g., a strongest connection signal, a fastest connection, etc.). In some embodiments, the to-be-controlled Bluetooth device can perform a function corresponding to the control instruction and/or control request in response to receiving the control instruction and/or control request from a Bluetooth gateway with which the to-be-controlled Bluetooth device has a connection and/or quality of service equal to or above a threshold connection value and/or threshold quality of service. For example, the to-be-controlled Bluetooth device can perform a function corresponding to the control instruction and/or control request in response to receiving the control instruction and/or control request from the Bluetooth gateway nearest to the to-be-controlled Bluetooth device.

Referring to FIG. 2, in response to server 220 receiving an on/off voice request (e.g., a control request) from the living room Bluetooth gateway 210a, server 220 communicates the on/off voice request to the Bluetooth gateway 210a deployed in the living room and to the Bluetooth gateway 210b deployed on the third floor so that one of these Bluetooth gateways 210 (e.g., the Bluetooth gateway having a signal range that is capable of covering the third-floor Bluetooth lamp 230c) can control the on/off status of the third-floor Bluetooth lamp (e.g., the Bluetooth gateway that is able to communicate the control request or instructions corresponding thereto the third-floor Bluetooth lamp 230c).

In some embodiments, server 120 determines a target Bluetooth gateway from among the plurality of Bluetooth gateways 110 with which to invoke control over the to-be-controlled Bluetooth device (e.g., a Bluetooth gateway through which the control request or control instructions are provided to the to-be-controlled Bluetooth device). In some embodiments, the to-be-controlled Bluetooth device is determined based at least in part on the control request. For example, the control request sent by one or more of the plurality of Bluetooth gateways 110 to server 120 includes an identifier (ID) of the to-be-controlled Bluetooth device. As another example, the control request comprises an indication of a type of device corresponding to the to-be-controlled Bluetooth device. As another example, the to-be-controlled Bluetooth device is determined based at least in part on a type of command corresponding to the control request. For example, the server (or a Bluetooth gateway) can determine the to-be-controlled Bluetooth device or a type of to-be-controlled Bluetooth device based at least in part on the command corresponding to the control request. The server can store (or have access to) a mapping of commands to type of Bluetooth devices or a mapping of commands to Bluetooth devices. The server (or Bluetooth gateway) can determine the to-be-controlled Bluetooth device and/or the type of Bluetooth device corresponding to the to-be-controlled Bluetooth device based at least in part on the control request and the mapping of commands to type of Bluetooth devices or a mapping of commands to Bluetooth devices.

According to various embodiments, server 120 determines the to-be-controlled Bluetooth device based at least in part on the control request, and in response to determining the to-be-controlled device corresponding to the control request, server 120 determines one or more target Bluetooth gateways with which to control the to-be-controlled Bluetooth device 130 (e.g., via which server 120 will communicate with the to-be-controlled Bluetooth device).

According to various embodiments, server 120 determines the target gateway before determining the to-be-controlled Bluetooth device ID. In some embodiments, server 120 determines the to-be-controlled Bluetooth device ID before the target gateway.

According to various embodiments, in response to (or in connection with) server 120 determining a target Bluetooth gateway from among the plurality of Bluetooth gateways 110, server 120 determines the to-be-controlled Bluetooth device ID from within the received control request (or based at least in part on the received control request) and determines the Bluetooth device corresponding to the to-be-controlled Bluetooth device ID. In response to determining the to-be-controlled Bluetooth device based at least in part on the control request (e.g., the to-be-controlled Bluetooth device ID), server 120 selects from among the plurality of Bluetooth gateways 110 the Bluetooth gateway with which to implement control over the to-be-controlled device. As an example, server 120 selects, from among plurality of Bluetooth gateways 110, a target Bluetooth gateway having signal range that is capable of covering the to-be-controlled Bluetooth device to serve as the target Bluetooth gateway. According to various embodiments, server 120 selects one or more target Bluetooth gateways with which to implement control of the to-be-controlled Bluetooth device (e.g., server 120 can select a single target Bluetooth gateway, or a plurality of target Bluetooth gateways). In some embodiments, the target Bluetooth gateways include all of the plurality of Bluetooth gateways 110 of the Bluetooth mesh network 100 or a subset of the plurality of Bluetooth gateways 110 of the Bluetooth mesh network 100. The process of determining one or more target Bluetooth gateways and/or providing the control request (or control instruction corresponding to the control request) to the one or more target Bluetooth gateways ensures a higher likelihood that the to-be-controlled Bluetooth device is successfully controlled in accordance with the control request, and limits or avoids occupying a large number of signal channels as a result of a greater number of Bluetooth gateways participating in the actual process for controlling the to-be-controlled Bluetooth device.

Server 120 can use various approaches (or processes) for selecting one or more target Bluetooth gateways from the plurality of Bluetooth gateways 110. For example, the server can use various approaches for selecting one or more Bluetooth gateways that have a signal range capable of covering the to-be-controlled Bluetooth device. Some of the approaches for selecting three or more Bluetooth gateways that have a signal range that is capable of covering the to-be-controlled Bluetooth device are discussed below.

First approach for determining a target Bluetooth gateway: Server 120 uses positional relationships of the plurality of Bluetooth gateways 110 to the to-be-controlled Bluetooth device as a basis to select from among the plurality of Bluetooth gateways 110 the Bluetooth gateway having a distance from the to-be-controlled Bluetooth device that satisfies a threshold distance condition to serve as the target Bluetooth gateway. In some embodiments, a mapping of locations of Bluetooth devices within the Bluetooth mesh network or in relation to one or more Bluetooth gateways is stored (e.g., at or accessible by server 120). In some embodiments, a mapping of distances between one or more Bluetooth devices connected to a Bluetooth mesh network and one or more Bluetooth gateways is stored (e.g., at or accessible by server 120). The mapping of locations of Bluetooth devices within Bluetooth mesh network 100 or in relation to one or more Bluetooth gateways can be updated for a particular Bluetooth device at a time when the particular Bluetooth device is added (or connected to) the Bluetooth mesh network 100.

The positional relationships of the plurality of Bluetooth gateways 110 to the to-be-controlled Bluetooth device can be predetermined at the time the to-be-controlled Bluetooth device is connected to the Bluetooth mesh network 100. The server 120 can determine a distance between the to-be-controlled Bluetooth device and one or more of the plurality of Bluetooth gateways 110 based at least in part on the positional relationships. One or more of the plurality of Bluetooth gateways 110 respectively corresponding to a distance from the to-be-controlled Bluetooth device satisfying a set distance requirement (e.g., less than a predefined threshold distance) can be determined to be a target Bluetooth gateway (e.g., a Bluetooth gateway to be used for control of the to-be-controlled Bluetooth device). In some embodiments, one or more target Bluetooth gateways can be determined. For example, each Bluetooth gateway of the Bluetooth mesh network 100 for which the distance from the to-be-controlled Bluetooth devices satisfies the set distance requirement can be determined to be a target Bluetooth gateway. In some embodiments, the one Bluetooth gateway that, out of the plurality of Bluetooth gateways 110, is closest to the to-be-controlled Bluetooth device is determined to be the target Bluetooth gateway. In some embodiments, the one Bluetooth gateway out of the plurality of the Bluetooth gateways 110 corresponding to a distance from the to-be-controlled Bluetooth device that is less than a threshold value is determined to be the target Bluetooth gateway.

For example, a Bluetooth mesh network is deployed in a three-story building, and Bluetooth lamps located on the first, second, and third floors of the building are connected to the Bluetooth mesh network. Bluetooth gateways are deployed in the living room and on the third floor. When the Bluetooth lamps in the living room and on the second and third floors are connected to the Bluetooth mesh network, each positional relationship between the living-room and second- and third-floor Bluetooth lamps and the Bluetooth gateways deployed in the living room and the third floor is individually recorded. In response to a user in the living room inputting a control request (e.g., an on/off voice request) with respect to the third-floor Bluetooth lamp, the server connected to the Bluetooth mesh network can determine that the Bluetooth gateway on the third floor corresponds to the target Bluetooth gateway (e.g., based on the recorded positional relationships between the Bluetooth gateways and the third-floor Bluetooth lamp). In response to determining the target Bluetooth gateway, the server uses the third-floor Bluetooth gateway in connection with implementing control over the third-floor Bluetooth lamp. For example, the server communicates with the third-floor Bluetooth lamp via the target Bluetooth gateway.

Second approach for determining a target Bluetooth gateway: Server 120 determines one or more Bluetooth gateways based at least in part on historical information. In some embodiments, the historical information comprises information pertaining to historical record(s) of communications between one or more Bluetooth gateways of the plurality of Bluetooth gateways 110 and the to-be-controlled Bluetooth device. For example, server 120 determines from among the plurality of Bluetooth gateways 110 a Bluetooth gateway having a historical record of communications with the to-be-controlled Bluetooth device. One or more Bluetooth gateways being associated with a historical record of communications with the to-be-controlled Bluetooth device can be determined to be one or more target Bluetooth gateways. In some embodiments, server 120 determines one or more Bluetooth gateways being associated with a historical record of communication with the to-be-controlled Bluetooth device for which a history of communications exceeds a threshold to be one or more target Bluetooth gateways. In some embodiments, server 120 determines the target Bluetooth gateway to correspond to the Bluetooth gateway of the plurality Bluetooth gateways 110 having a greatest amount of historical communication with the to-be-controlled Bluetooth device. With regard to each communication interaction process between the plurality Bluetooth gateways 110 and the Bluetooth devices 130 connected to the Bluetooth mesh network 100, the server 120 determines the Bluetooth gateway ID and the Bluetooth device ID associated with the establishment of the communication connection, and the server 120 records the correspondence between the two. For example, the server 120 records an indication (e.g., an identifier) of the Bluetooth gateway with which a corresponding Bluetooth device registered or joined the Bluetooth mesh network. The server 120 can store such an indication in association with the corresponding Bluetooth device. In response to a control request for which a Bluetooth device is to be controlled, the server can determine the target Bluetooth gateway to be the Bluetooth gateway stored in association with the corresponding Bluetooth device. In some embodiments, the server 120 deems a historical record of communication between a particular Bluetooth gateway and a Bluetooth device as an indication that the particular Bluetooth gateway is within communication range of the Bluetooth device. According to various embodiments, in connection with selecting a target Bluetooth gateway from among the plurality of Bluetooth gateways 110, the server 120 queries for pre-established correspondences between Bluetooth gateways and Bluetooth devices, and selects a Bluetooth gateway corresponding to the to-be-controlled Bluetooth device as the target Bluetooth gateway.

In the context of the example described above with respect to a Bluetooth mesh network being deployed in a residence, a control request can be input at a first location of the residence with respect to a Bluetooth device located at a second location of the residence. For example, the user on the first floor of the building inputs a control request (e.g., an on/off voice request) with respect to the second-floor Bluetooth lamp. However, according to the example described above, the second floor does not have a Bluetooth gateway deployed thereon. Because no Bluetooth gateway is deployed on the second floor, the server 120 can determine the target Bluetooth gateway based at least in part on historical information pertaining to communications between one or more Bluetooth gateways and the to-be-controlled Bluetooth device (e.g., the second-floor Bluetooth lamp). In this example, assuming that the living room Bluetooth gateway has a historical record of communications with the second-floor Bluetooth lamp, then the living-room Bluetooth gateway can be determined to be the target Bluetooth gateway (e.g., via which the server 120 will invoke control of the second-floor Bluetooth lamp).

According to various embodiments, if historical records of communications between multiple Bluetooth gateways 110 and the to-be-controlled Bluetooth device exist, the one or more Bluetooth gateways having a number of historical communications that is greater than a set threshold value (e.g., a historical communication threshold value) are selected as the one or more target Bluetooth gateways. In some embodiments, the Bluetooth gateway corresponding to the highest number of historical communications between the Bluetooth gateways 110 and the to-be-controlled Bluetooth device is selected to serve as the target Bluetooth gateway.

In response to determining the target Bluetooth device, the server 120 can exercise control based at least in part on the control request over the to-be-controlled Bluetooth device via the target Bluetooth gateway. For example, the server 120 sends communications (e.g., command instructions, etc.) to the to-be-controlled Bluetooth device via the target Bluetooth gateway. Server 120 can use various approaches for exercising control over the to-be-controlled Bluetooth device via the target Bluetooth gateway. Some of the approaches for exercising control over the to-be-controlled Bluetooth device via the target Bluetooth gateway are discussed below.

The first approach for exercising control over the to-be-controlled Bluetooth device is disclosed. In some embodiments, in response to receiving the control request and determining the target Bluetooth gateway, the server 120 sends the control request (or information corresponding to the control request, such as a command instruction) directly to the target Bluetooth gateway. As an example, in response to receiving the control request (or information corresponding to the control request), the target Bluetooth gateway can send the control request or corresponding information to the to-be-controlled Bluetooth device and the to-be-controlled Bluetooth device can perform a corresponding function. As another example, in response to receiving the control request (or information corresponding to the control request), the target Bluetooth gateway can control the to-be-controlled Bluetooth device (e.g., cause the to-be-controlled Bluetooth device to perform a corresponding function) based at least in part on the control request. In such an implementation, the target Bluetooth gateway can subject the control request to intent analysis in order to obtain the user's control intent and then execute the corresponding control logic based on the control intent. For example, the target Bluetooth gateway can extract (e.g., obtain) information pertaining to the control request from the control request. The information obtained from the control request can include one or more of an indication (e.g., an ID) of the to-be-controlled Bluetooth device, an indication of a function that is to be performed at the to-be-controlled Bluetooth device, etc.

In some embodiments, the control request with respect to the to-be-controlled Bluetooth device is input (e.g., by a user) based at least in part on a voice input, a gesture input, or by triggering a specific physical key (e.g., a button on a terminal, a button displayed on a graphical user interface displayed on a touch screen of the terminal, etc.).

The target Bluetooth gateway can quickly and accurately acquire (e.g., determine) the user's control intent based on a text instruction received from the server 120. For example, the server 120 converts the user-issued control request into a text instruction and communicates the text instruction to the target Bluetooth device. In response to receiving the text instruction from the server 120, the target Bluetooth device determines the control intent (e.g., the command function to be performed) based on the text instruction. For example, in response to the control request being input (e.g., by the user) via a voice request, the server 120 converts the voice request to a text instruction using speech recognition technology and provides the text instruction to the target Bluetooth gateway. In response to receiving the text instruction, the target Bluetooth gateway performs intent analysis with respect to the text instruction to determine the user's control intent.

As used herein, "intent analysis" refers to the process of determining from the text instruction the Bluetooth device (e.g., on the Bluetooth mesh network 100) that corresponds to the to-be-controlled Bluetooth device, and determining of the type of control process corresponding to the control request (e.g., the control function being requested by the user with respect to the to-be-controlled Bluetooth device). For example, if the text instruction is: "turn on third-floor Bluetooth lamp," the control intent obtained through intent analysis can be: "execute activation operation on third-floor Bluetooth lamp."

The second approach for exercising control over the to-be-controlled Bluetooth device is disclosed. In some embodiments, in response to receiving the control request and determining the target Bluetooth gateway, the server 120 performs an intent analysis on the control request (e.g., before providing the control request or corresponding command instruction to the target Bluetooth gateway). For example, the server 120 determines the control intent (e.g., the user's control intent) corresponding to the control request. In response to determining the control intent, the server 120 provides (e.g., communicates) the control intent to the target Bluetooth gateway. The target Bluetooth gateway can execute the corresponding control logic based on the control intent. For example, the target Bluetooth gateway can provide one or more control instructions to the to-be-controlled Bluetooth device based at least in part on the control intent. As an example, if the control request is a voice request (e.g., a control request that is input via a voice command), the server 120 converts the control request into a text instruction in connection with performing intent analysis with respect to the control request. The server 120 can subject the text instruction to semantic recognition to recognize the control intent comprised in the text instruction. As another example, if the control request is a gesture request (e.g., a control request that is input via a gesture captured by one or more sensors), the server 120 performs a look up with respect to a pre-established mapping between the gestures (or gesture requests) and the control intent, and the server 120 obtains a control intent corresponding to the control request based at least in part on the mapping of gestures to control intents.

In some embodiments according to the implementation discussed above with respect to the second approach for exercising control over the to-be-controlled Bluetooth device, the server 120 performs the intent analysis. A server generally has more powerful computing capabilities than a Bluetooth gateway in a Bluetooth mesh network, and thus a server can more quickly determine the control intent corresponding to a control request. In such an implementation, after the target Bluetooth gateway receives the control intent, the target Bluetooth gateway does not need to perform an intent analysis operation. Accordingly, the target Bluetooth gateway can more efficiently and quickly perform the control response and thereby enhance the user's experience.

Figure 3:
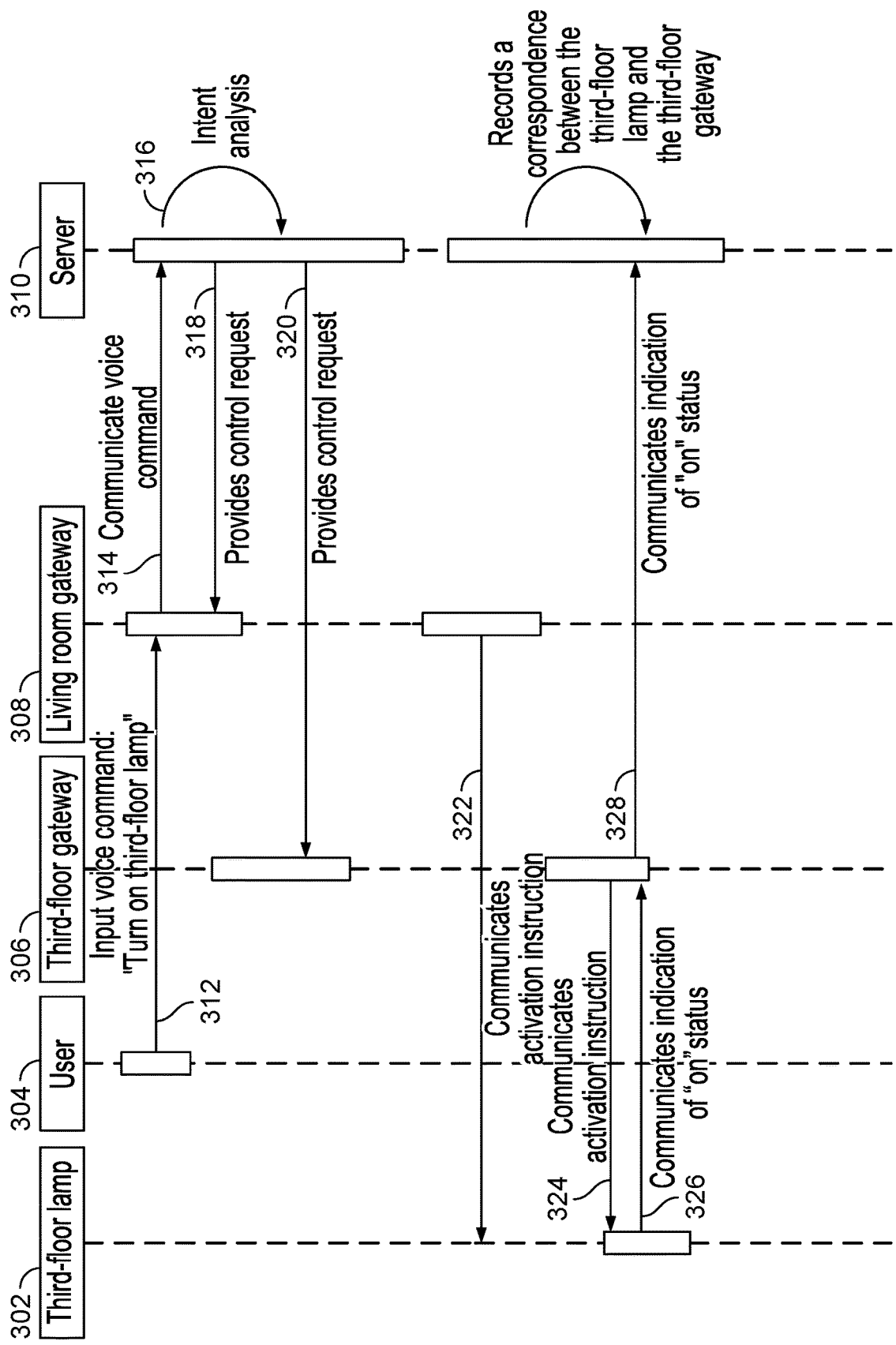
FIG. 3 is a flowchart of a method of Bluetooth mesh network communications according to various embodiments of the present application.

FIG. 3 is a flowchart of a method of Bluetooth mesh network communications according to various embodiments of the present application.

Referring to FIG. 3, process 300 for Bluetooth mesh network communications is provided. Process 300 can be implemented in connection with Bluetooth mesh network 100 of FIG. 1, and/or Bluetooth mesh network 200 of FIG. 2. Process 300 can be implemented in process 400 of FIG. 4, and/or process 500 of FIG. 5. At least part of process 300 can be implemented at least in part by computer system 600 of FIG. 6.

Process 300 provides a method for communicating across a Bluetooth mesh network in the context of the example described above in which the Bluetooth gateways and Bluetooth device(s) are deployed in a residence.

If user 304 wants to control third-floor Bluetooth lamp 302, user 304 can input a control request with respect to third-floor Bluetooth lamp 302. For example, user 304 can input a voice command in connection with controlling third-floor Bluetooth lamp 302. The control request can indicate a type of control and a target Bluetooth device on the Bluetooth mesh network to be controlled. For example, with respect to third-floor Bluetooth lamp 302, the type of control can toggle third-floor Bluetooth lamp 302 on and off (e.g., "turn on third-floor lamp" or "turn off third-floor lamp"). At 312, user 304 inputs a voice command (e.g., "turn on third-floor lamp"). In response to user 304 speaking a voice command, a Bluetooth device or Bluetooth gateway connected to the Bluetooth mesh network can obtain (e.g., detect) the voice command.

As illustrated in FIG. 3, at 312, living room gateway 308 receives the voice command input by user 304. A microphone connected to living room gateway 308 can receive (e.g., detect) the voice command. For example, living room gateway 308 (or a terminal connected to living room gateway 308) can determine that the sound provided by user 304 corresponds to a voice command. In some embodiments, living room gateway 308 performs a speech-to-text analysis on the sound in connection with determining that the sound corresponds to a voice command. Living room gateway 308 can perform a query with respect to a mapping of text to commands in connection with determining that the sound corresponds to a voice command. The mapping of text to commands can include a mapping of text to a type of command and/or a mapping of text directly to commands. In some embodiments, living room gateway 308 communicates the voice command input by user 304 without performing speech-to-text analysis. According to various embodiments, multiple Bluetooth gateways can obtain the voice command and can contemporaneously process and/or communicate the voice command to a server. For example, Bluetooth gateways within proximity of user 304 (e.g., within a threshold distance or that detect the voice command such as in relation to one or more threshold volumes) detect the voice command and respectively process and/or forward the voice command to server 310.

At 314, living room gateway 308 communicates the voice command to server 310. As an example, living room gateway 308 can provide the speech input by user 304 to server 310. As another example, living room gateway 308 can process the speech input by user 304 (e.g., perform a speech-to-text processing, etc.). In some embodiments, living room gateway 308 communicates the voice command to server 310 via the Internet. For example, server 310 is a cloud server. The Bluetooth mesh network can be connected to the Internet and living room gateway 308 provides the voice command to server 310 via the Internet connection between server 310 and the Bluetooth mesh network. Server 310 can receive the voice command from living room gateway 308.

In response to receiving the voice command, server 310 performs processing with respect to the voice command. For example, server 310 can perform an intent analysis with respect to the voice command (e.g., the control request) at 316. The intent analysis can include performing a speech-to-text analysis (e.g., converting the voice command into text). As an example, server 310 performs intent analysis on the voice control request, and the control intent that server 310 obtains is: "execute activation operation on third-floor lamp."

According to various embodiments, server 310 provides the control request (or information pertaining to the control request) to one or more Bluetooth gateways connected to the Bluetooth mesh network. For example, server 310 contemporaneously provides the control request to a plurality of Bluetooth gateways. In some embodiments, server 310 determines a particular Bluetooth gateway(s) to which to send the control request.

At 318, server 310 provides the control request to living room gateway 308. Server 310 can provide the control request to living room gateway 308 in response to receiving the voice command. In some embodiments, server 310 provides the control request in response to determining the control intent (e.g., determining a device to be controlled, determining a function or command to be performed with respect to the device to be controlled, etc.).

At 320, server 310 provides the control request to third-floor gateway 306. Server 310 can provide the control request to living room gateway 308 in response to receiving the voice command. In some embodiments, server 310 provides the control request in response to determining the control intent (e.g., determining a device to be controlled, determining a function or command to be performed with respect to the device to be controlled, etc.).

According to various embodiments, server 310 simultaneously (or contemporaneously) provides the control request to third-floor gateway 306 and living room gateway 308.

As an example, server 310 sends the "execute activation operation on third-floor lamp" control intent simultaneously (or contemporaneously) to the third-floor gateway 306 and the living room gateway 308. According to various embodiments, living-room gateway 308 is relatively far from the third-floor lamp and the third-floor gateway is relatively close to the third-floor lamp (e.g., third-floor gateway 306 is closer to third-floor lamp 302 than living room gateway 308). In some embodiments, because third-floor lamp 302 is within the signal coverage range of third-floor gateway 306, third-floor gateway 306 can communicate a control instruction with respect to third-floor lamp 302. For example, third-floor gateway 306 can issue an activation instruction for the third floor. In some embodiments, third-floor gateway 306 and living room gateway 308 each respectively communicate a control instruction corresponding to the control request (or communicate the control request) to third-floor lamp 302. Third-floor gateway 306 and living room gateway 308 can communicate the control instruction (or control request) to third-floor lamp 302 in response to respectively receiving the control request (or control intent). For example, in response to receiving the control request (or control intent) from server 310, third-floor gateway 306 and/or living room gateway 308 can determine the Bluetooth device on the Bluetooth mesh network corresponding to the control request (e.g., third-floor lamp 302). The control request (or control intent) can comprise an indication of the device that is to be controlled or an indication of a type of device that is to be controlled. According to various embodiments, the Bluetooth device on the Bluetooth mesh network that is to be controlled (e.g., third-floor lamp 302) is determined based at least in part on the control request (or the control intent).

At 322, living room gateway 308 communicates an activation instruction (e.g., a control instruction) to third-floor lamp 302. In some embodiments, living room gateway 308 communicates the activation instruction to third-floor lamp 302 if living room gateway 308 determines that third-floor lamp 302 is within communication range of living room gateway 308. If third-floor lamp 302 is within communication range of living room gateway 308, third-floor lamp 302 receives the control instruction (or control intent).

At 324, third-floor gateway 306 communicates an activation instruction (e.g., a control instruction) to third-floor lamp 302. In some embodiments, third-floor gateway 306 communicates the activation instruction to third-floor lamp 302 if third-floor gateway 306 determines that third-floor lamp 302 is within communication range of third-floor gateway 306. If third-floor lamp 302 is within communication range of third-floor gateway 306, third-floor lamp 302 receives the control instruction (or control intent).

According to various embodiments, third-floor gateway 306 and living room gateway 308 simultaneously (or contemporaneously) communicate the activation instruction to third-floor lamp 302.

In response to receiving the control instruction (or control intent), third-floor lamp 302 performs a corresponding function. For example, if the control instruction corresponds to an instruction to turn on third-floor lamp 302, third-floor lamp 302 turns on. In some embodiments, if the Bluetooth device that is to be controlled (e.g., third-floor lamp 302) receives control instructions from a plurality of Bluetooth gateways (e.g., third-floor gateway 306 and living room gateway 308), each corresponding to a same control request, then the third-floor lamp 302 only responds or performs a corresponding function in connection with one of the plurality of control instructions received. In some embodiments, the control instruction (or control intent) comprises an identifier (e.g., corresponding to a control request) to identify the control instruction from other control instructions for other control requests. The identifier can uniquely identify the control instruction.

According to various embodiments, in response to performing the corresponding function, third-floor lamp 302 provides an indication that third-floor lamp 302 performed the function corresponding to the control instruction (or control intent). In some embodiments, in response to performing the corresponding function, third-floor lamp 302 provides an indication of a current status of third-floor lamp 302 (e.g., a status corresponding to the control request such as "on").

In some embodiments, third-floor lamp 302 communicates the indication that the corresponding function was performed and/or the indication of the current status to one or more Bluetooth gateways on the Bluetooth mesh network. For example, third-floor lamp 302 provides the indication that the corresponding function was performed and/or the indication of the current status to the one or more Bluetooth gateways from which the control instruction (or control intent) was received. In some embodiments, third-floor lamp 302 communicates the indication that the corresponding function was performed and/or the indication of the current status to the Bluetooth gateway within closest proximity to third-floor lamp 302 (e.g., the Bluetooth gateway having a shortest distance to third-floor lamp 302). In some embodiments, third-floor lamp 302 communicates the indication that the corresponding function was performed and/or the indication of the current status to the Bluetooth gateway with which third-floor lamp 302 has a best connection (e.g., strongest signal strength, fastest connection, best quality of service, etc.). In some embodiments, third-floor lamp 302 communicates the indication that the corresponding function was performed and/or the indication of the current status to the Bluetooth gateway from which third-floor lamp 302 first received the corresponding control instruction.

At 326, third-floor lamp 302 communicates the indication that the corresponding function was performed and/or the indication of the current status to third-floor gateway 306. Third-floor gateway 306 can receive the indication that the corresponding function was performed and/or the indication of the current status.

In response to receiving the indication that the corresponding function was performed and/or the indication of the current status, the corresponding Bluetooth gateway communicates the indication that the corresponding function was performed and/or the indication of the current status to server 310.

At 328, third-floor gateway 306 communicates the indication that the corresponding function was performed and/or the indication of the current status. For example, in response to receiving the indication that the corresponding function was performed and/or the indication of the current status, the third-floor gateway provides the indication that the corresponding function was performed and/or the indication of the current status to server 310. The Bluetooth mesh network can be connected to the Internet and third-floor gateway 306 provides the indication that the corresponding function was performed and/or the indication of the current status to server 310 via the Internet connection between server 310 and the Bluetooth mesh network. Server 310 can receive the indication that the corresponding function was performed and/or the indication of the current status from third-floor gateway 306.

At 330, server 310 stores information based at least in part on the indication that the corresponding function was performed and/or the indication of the current status. For example, in response to receiving the indication that the corresponding function was performed and/or the indication of the current status, server 310 stores a correspondence between third-floor lamp 302 and third-floor gateway 306. In some embodiments, in response to receiving the indication that the corresponding function was performed and/or the indication of the current status, server 310 stores an association between the Bluetooth device to be controlled (e.g., the Bluetooth device corresponding to the control request) and the Bluetooth gateway to which the Bluetooth device to be controlled provided the indication that the corresponding function was performed and/or the indication of the current status. In some embodiments, in response to receiving the indication that the corresponding function was performed and/or the indication of the current status, server 310 stores an association between the Bluetooth device to be controlled (e.g., the Bluetooth device corresponding to the control request) and the Bluetooth gateway from which the Bluetooth device received the control instruction.

According to some embodiments, in response to receiving the indication that the corresponding function was performed and/or the indication of the current status, server 310 stores historical communication information pertaining to the communication between the Bluetooth device to be controlled (e.g., the Bluetooth device corresponding to the control request) and the Bluetooth gateway to which the Bluetooth device to be controlled provided the indication that the corresponding function was performed and/or the indication of the current status.

In some embodiments, in response to server 310 determining the control intent, server 310 can determine the target Bluetooth gateway to which to send the control intent (or control instruction) in connection with controlling the to-be-controlled Bluetooth device (e.g., third-floor lamp 302). As an example, in connection with the analysis of the control request to determine that the control intent corresponds to "execute activation operation on third-floor lamp," server 310 uses the position determined at a time the third-floor lamp 302 was connected to the Bluetooth mesh network (or otherwise when third-floor lamp 302 is re-registered with the Bluetooth mesh network) as a basis to select the third-floor gateway 306 as the target Bluetooth gateway and send to the third-floor gateway 306 a control intent (or control instruction) corresponding to "execute activation operation on third-floor lamp."

In some embodiments, in response to a Bluetooth gateway (e.g., Bluetooth gateway 110a of FIG. 1) receiving the control request (e.g., from the user), the Bluetooth gateway sends the control request directly to the server 120. In response to the server 120 receiving the control request, the server 120 performs intent analysis with respect to the control request to determine a corresponding control intent (e.g., to convert the control request into a control intent). In response to determining the corresponding control intent, server 120 sends the control intent to the target Bluetooth gateway. In some embodiments, server 120 converts the control request into a text instruction and communicates (e.g., issues) the corresponding text instruction directly to the target Bluetooth gateway. In response to receiving the text instruction, the Bluetooth gateway performs the intent analysis.

In some embodiments, in response to a Bluetooth gateway (e.g., Bluetooth gateway 110a of FIG. 1) receiving the control request (e.g., from the user), the Bluetooth gateway determines (e.g., recognizes) the control request as a text instruction (e.g., converts the control request to a text instruction) and sends the corresponding text instruction to the server 120. Communication of text instructions is generally more efficient than communication of voice commands (e.g., speech) because of size of corresponding information, etc. Because communication of the text instruction is relatively more efficient than sending an audio file, etc., the conversion of the control request to a text instruction by the Bluetooth gateway improves the response speed of the Bluetooth mesh network. For example, if the control request issued by the user is a voice request, the Bluetooth gateway 110a converts the voice request into a text instruction based at least in part on speech recognition technology and sends the converted text instruction to the server 120.

According to various embodiments, in the Bluetooth mesh network, after the to-be-controlled Bluetooth device receives the control signal communicated by the Bluetooth gateway (e.g., the target Bluetooth gateway) which is determined to control the to-be-controlled Bluetooth device (based at least in part on the control request), and after the to-be-controlled Bluetooth device executes the corresponding action based on the control signal, the to-be-controlled Bluetooth device reports (e.g., communicates) its current status to the Bluetooth gateway (e.g., the target Bluetooth gateway) that is determined to control the to-be-controlled Bluetooth device. As illustrated in FIG. 3, at 326 the third-floor lamp 302 reports its "on" status. In response to the Bluetooth gateway (e.g., the target Bluetooth gateway) that controls the to-be-controlled Bluetooth device receiving the current status reported by the to-be-controlled Bluetooth device, the Bluetooth gateway (e.g., the target Bluetooth gateway) sends the current status of the to-be-controlled Bluetooth device to the server (e.g., server 310 in the case of process 300). In response to the server receiving the current status of the to-be-controlled Bluetooth device, the server can determine that the control request was successfully completed and stop issuing the control intent or the text instruction. In some embodiments, if the server does not receive an indication that the corresponding function was performed and/or an indication of the current status of the to-be-controlled Bluetooth device within a threshold period of time, the server re-sends the control intent to one or more Bluetooth gateways (e.g., the target Bluetooth gateway) on the Bluetooth mesh network. The server can continue to periodically send the control intent (or control instruction) according to a time period if the server does not receive an indication that the corresponding function was performed and/or an indication of the current status of the to-be-controlled Bluetooth device within a threshold period of time. In response to the server receiving the current status, the server can store a correspondence between the Bluetooth gateway (e.g., the target Bluetooth gateway) that reported the current status and the to-be-controlled Bluetooth device. The storing of the correspondence between the Bluetooth gateway (e.g., the target Bluetooth gateway) that reported the current status and the to-be-controlled Bluetooth device can form a historical communication record for one or more of the corresponding Bluetooth gateway and the to-be-controlled Bluetooth device. The server can use the historical communication record in connection with determining a target Bluetooth gateway for a subsequent control request, etc.

Various embodiments include provisioning within a Bluetooth mesh network. In some embodiments, a Bluetooth gateway (e.g., Bluetooth gateway 110a of FIG. 1) is the provisioner. In some embodiments, one or more Bluetooth gateways operate as a provisioner. The provisioner cooperates with the server 120 to implement the provisioning function specified in the Bluetooth mesh protocol. The Bluetooth mesh protocol can be a standard protocol used across various Bluetooth mesh networks, or can be a protocol specifically configured for a particular Bluetooth mesh network. For example, the provisioner and server cooperate to connect an unprovisioned Bluetooth device to a Bluetooth mesh network.

According to various embodiments, the provisioning specified in a Bluetooth mesh protocol is a configuration process whereby unprovisioned Bluetooth devices become member nodes in a particular Bluetooth mesh network. The Bluetooth mesh protocol comprises (or defines) a process of providing unprovisioned Bluetooth devices with the provisioning data associated with connecting the unprovisioned Bluetooth device to the Bluetooth mesh network. For example, the Bluetooth mesh protocol comprises (or defines) a process for the provisioning of data required for an unprovisioned Bluetooth device to successfully connect to the Bluetooth mesh network. According to various embodiments, a provisioning process includes other steps and communication of other information than merely the aforementioned provisioning data. In some embodiments, the server 120 allocates provisioning data for unprovisioned Bluetooth devices detected by the plurality of one or more Bluetooth gateways 110. For example, the role of the server corresponds to central responsibility for allocating the provisioning data for the unprovisioned Bluetooth devices. The plurality of one or more Bluetooth gateways 110 detect unprovisioned Bluetooth devices and perform provisioning operations for the detected unprovisioned Bluetooth devices. At least one of the plurality of one or more Bluetooth gateways 110 performs the provisioning operations for the detected unprovisioned Bluetooth devices based at least in part on the provisioning data allocated by the server 120. For example, the at least one of the plurality of one or more Bluetooth gateways 110 performs the provisioning operations for the detected unprovisioned Bluetooth devices in connection with successfully connecting the unprovisioned Bluetooth devices to the Bluetooth mesh network.

According to various embodiments, "provisioning data" refers to data that an unprovisioned Bluetooth device uses (e.g., requires) to successfully connect to a Bluetooth mesh network 100. Examples of provisioning data include NetKey, AppKey, and a unicast address. NetKey ensures the security of network layer communications and is shared among all member nodes in the Bluetooth mesh network. The possession of a given NetKey defines membership in a given Bluetooth mesh network 100. Bestowal of the NetKey corresponding to a Bluetooth mesh network 100 on a Bluetooth device is an important component of a provisioning operation. "Member nodes" refer to Bluetooth devices that successfully connect to a Bluetooth mesh network 100. An "AppKey" is a Bluetooth mesh network application key. For example, the AppKey is a key for communication between a Bluetooth gateway and a Bluetooth device connected to a Bluetooth mesh network in a specific application scenario (e.g., a door-locking application scenario). A "unicast address" is the address used in connection with communicating with other nodes after an unprovisioned Bluetooth device successfully connects to the Bluetooth mesh network 100.

At least one of the plurality of Bluetooth gateways 110 connected to a Bluetooth mesh network performs provisioning operations for a detected unprovisioned Bluetooth device according to the provisioning data. In some embodiments, the "provisioning operation" refers to some provisioning functions specified in the Bluetooth mesh protocol. The provisioning operation can include the forwarding of provisioning data to a detected unprovisioned Bluetooth device. The detected unprovisioned Bluetooth device can use the provisioning data forwarded thereto to connect to the Bluetooth mesh network 100.

According to various embodiments, an unprovisioned Bluetooth device corresponds to a Bluetooth device that is not yet connected to a Bluetooth mesh network 100. In some embodiments, after the aforesaid unprovisioned Bluetooth device successfully connects to the Bluetooth mesh network 100 (e.g., through a provisioning process), such a Bluetooth device can serve nodes in the Bluetooth mesh network 100. For example, the Bluetooth mesh network comprises: Bluetooth devices successfully connected to the Bluetooth mesh network through provisioning operations.

In some embodiments, a server-Bluetooth gateway collaborative mode is employed. The Bluetooth mesh provisioning process can comprise interaction between or among at least one of the plurality of Bluetooth gateways 110 and the server 120. One or more of the plurality of Bluetooth gateways 110 can detect unprovisioned Bluetooth devices (e.g., devices that are unprovisioned with respect to the Bluetooth mesh network to which the plurality of Bluetooth gateways are connected). The server-Bluetooth gateway collaborative mode can expand the detection range beyond that of single nodes and thus can expand the provisioning coverage of a Bluetooth mesh network. In some embodiments, the plurality of Bluetooth gateways can also be deployed in a quantity commensurate with the required (e.g., desired) network coverage for the Bluetooth mesh network. Accordingly, the Bluetooth mesh network provisioning coverage can be flexibly expanded. The server-Bluetooth gateway collaborative mode thus overcomes a defect of existing mesh networks, namely the constraint on provisioning coverage.

For example, in some application scenarios for configuring or requiring the laying out of a Bluetooth mesh network, network coverage can be extensive, and the required or desired coverage can be configured by setting up a plurality of Bluetooth gateways. For example, home automation in a large residence can include deploying a Bluetooth mesh network. A plurality of Bluetooth gateways can be deployed within the residence to connect a plurality of Bluetooth devices located around the residence (e.g., Bluetooth lamps, Bluetooth switches, Bluetooth sockets, Bluetooth audio systems, Bluetooth refrigerators, Bluetooth drinking fountains, and other Bluetooth household appliances, etc.). The various Bluetooth devices can be connected to the Bluetooth mesh network based at least in part on provisioning operations. For example, a Bluetooth gateway is to be deployed in the living room of the residence, the second-floor stairway of the residence, the third-floor stairway of the residence, and other similar locations. Accordingly, Bluetooth devices can be detected in or around (e.g., within a coverage range of) the living room, the second floor, the third floor, and other locations. Various embodiments solve the problem of the related art, namely the fact that a single provisioner is unable to detect some Bluetooth devices because the provisioner is likely to be relatively distant from some Bluetooth devices (e.g., a single provisioner has a defined limited coverage range in contrast to the extensible coverage area of a Bluetooth mesh network in accordance with various embodiments). Further, a single provisioner does not need to be moved around the coverage area of the Bluetooth mesh network (e.g., from the living room to the second floor, then to the third floor, and back again to the living room) to detect Bluetooth devices in different positions. As a result, according to various embodiments, provisioning becomes simpler and more flexible and efficient, which is to the benefit of user experience.

According to various embodiments, the Bluetooth mesh network comprises a plurality of Bluetooth gateways. As a result, the Bluetooth mesh network according to various embodiments does not suffer from the single point of failure problem that afflicts Bluetooth mesh networks corresponding to the related art. In some embodiments, if a particular Bluetooth gateway fails, the other Bluetooth gateways can continue to operate, without paralyzing the entire Bluetooth mesh network. As a result, the Bluetooth mesh network according to various embodiments is relatively more robust than a Bluetooth mesh network of the related art.

Please note that the exemplary application scenario described above mainly serves to describe the advantages of a Bluetooth mesh network according to various embodiments and does not constitute a limit on application scenarios of the Bluetooth mesh network according to various embodiments. In some embodiments, the Bluetooth mesh network coverage is flexible (e.g., via the modification of the number of Bluetooth gateways) and can be used to provide a wider coverage area or a narrower coverage area.

In some embodiments, server 120 collaborates with one or more of the plurality of Bluetooth gateways 110 to provision unprovisioned Bluetooth devices to connect to the Bluetooth mesh network 100. For example, server 120 authorizes unprovisioned Bluetooth devices to connect to the Bluetooth mesh network 100 via the provisioning process with the one or more of the plurality of Bluetooth gateways 110. Server 120 and the plurality of Bluetooth gateways 110 can collaborate in different manners. Various forms of collaboration between server 120 and one or more of the plurality of Bluetooth gateways 110 exist.

In some embodiments, server 120 stores (or has access to) a list of unprovisioned Bluetooth devices. For example, a user can create and/or modify the list of unprovisioned Bluetooth devices (e.g., to add unprovisioned Bluetooth devices). If server 120 provides authorization to a user or a Bluetooth terminal (e.g., a Bluetooth gateway or Bluetooth device), the user can pre-save a list of unprovisioned Bluetooth devices on the server 120. The list of unprovisioned Bluetooth devices can be used in connection with determining the Bluetooth devices to be provisioned. For example, the server determines that provisioning (e.g., provisioning operations) is to be performed with respect to unprovisioned Bluetooth devices on the list of unprovisioned Bluetooth devices. In response to determining that provisioning (e.g., provisioning operations) is to be performed with respect to unprovisioned Bluetooth devices on the list of unprovisioned Bluetooth devices, server 120 can actively allocate provisioning data for one or more of the unprovisioned Bluetooth devices on the list of unprovisioned Bluetooth devices. The plurality of Bluetooth gateways 110 can detect unprovisioned Bluetooth devices within their respective signal coverage areas and report information pertaining to the unprovisioned Bluetooth devices (e.g., identifier, type, etc.) to the server 120. Server 120 can determine the appropriate provisioning data based at least in part on the information received from at least one of the plurality of Bluetooth gateways 110 and provide the provisioning data to one or more of the plurality of Bluetooth gateways 110. For example, server 120 can provide the provisioning data to Bluetooth gateways that detected a corresponding unprovisioned Bluetooth device. In response to receiving the provisioning data from the server 120, the corresponding Bluetooth gateway(s) can perform provisioning operations with respect to the corresponding detected unprovisioned Bluetooth devices according to the provisioning data. In some embodiments, server 120 actively allocates provisioning data for unprovisioned Bluetooth devices (e.g., the unprovisioned Bluetooth devices identified on the list of unprovisioned Bluetooth devices).

In some embodiments, server 120 allocates provisioning data in response to receiving a request for provisioning data with respect to an unprovisioned Bluetooth device detected by a Bluetooth gateway on the Bluetooth mesh network. For example, the Bluetooth gateway requests provisioning data from server 120 in response to detecting the corresponding unprovisioned Bluetooth device. In some embodiments, server 120 allocates provisioning data in response to receiving an indication that a Bluetooth gateway has detected an unprovisioned Bluetooth device. One or more of the plurality of Bluetooth gateways 110 in a Bluetooth mesh network 100 can detect unprovisioned Bluetooth devices within their respective signal coverage areas and provide information pertaining to the detected unprovisioned Bluetooth devices to server 120. Server 120 allocates and provides provisioning data for the detected unprovisioned Bluetooth devices. Server 120 can receive information pertaining to an unprovisioned Bluetooth device (e.g., identifier, type of device, location, signal strength, etc.) detected and provided by each of the plurality of Bluetooth gateways 110 (e.g., that detected the corresponding unprovisioned Bluetooth device). In response to receiving the information pertaining to the unprovisioned Bluetooth device information, server 120 allocates provisioning data for each of the corresponding detected, unprovisioned Bluetooth devices, and provides provisioning data to the corresponding Bluetooth gateways that detected the unprovisioned Bluetooth devices. The corresponding Bluetooth gateways that detected the unprovisioned Bluetooth devices perform provisioning (e.g., provisioning operations) with respect to the unprovisioned Bluetooth devices based at least in part on the provisioning data. In some embodiments, server 120 allocates provisioning data in response to a particular request by a Bluetooth gateway with respect to an unprovisioned Bluetooth device.

According to various embodiments, information pertaining to unprovisioned Bluetooth devices detected provided by one or more of the plurality of Bluetooth gateways 110 includes identifying information corresponding to the Bluetooth devices (e.g., universally unique identifiers (UUID), etc.). In some embodiments, information pertaining to unprovisioned Bluetooth devices includes signal strength information with respect to the corresponding Bluetooth devices (e.g., received signal strength indicators (RSSI), etc.). The UUID can include product ID, MAC address, and other information. The product ID can identify the Bluetooth device type, capabilities, and other such information. According to various embodiments, server 120 uses the information pertaining to unprovisioned Bluetooth devices detected and reported by Bluetooth gateways as a basis to identify the detected unprovisioned Bluetooth devices.

According to various embodiments, if an unprovisioned Bluetooth device is preparing to join the Bluetooth mesh network, the Bluetooth gateways near the unprovisioned Bluetooth device are notified of the unprovisioned Bluetooth device and/or the intent to join the Bluetooth mesh network. As an example, the Bluetooth gateways near the unprovisioned Bluetooth device are notified via broadcasting (e.g., a broadcast signal communicated by the corresponding unprovisioned Bluetooth device). If the unprovisioned Bluetooth device supports the PB-ADV bearer layer, the unprovisioned Bluetooth device can externally broadcast a beacon signal. If the unprovisioned Bluetooth device uses the PB-GATT bearer layer, the unprovisioned Bluetooth device can send connectable broadcast data packets. In response to receiving the beacon signal or broadcast data packet, the corresponding Bluetooth gateways can confirm detection of the Bluetooth device (e.g., the Bluetooth device that sent the beacon signal or broadcast data packets). In addition, in response to receiving the beacon signal or broadcast data packet, the corresponding Bluetooth gateways can determine that the corresponding Bluetooth device is prepared, and can start the provisioning process for the detected Bluetooth device.

In some embodiments, a user issues a detection instruction to the Bluetooth gateways. For example, the user can input a request for the Bluetooth gateway(s) to search for or detect the beacon signal or broadcast data packets. The Bluetooth gateway(s) can detect unprovisioned Bluetooth devices within their signal coverage areas in response to user-issued detection instructions. As an example, the user provides the detection instruction to at least a subset of the plurality of Bluetooth gateways 110 in a Bluetooth mesh network 100.

In some embodiments, a user issues a detection instruction individually to each of the plurality of Bluetooth gateways 110 in a Bluetooth mesh network 100 so as to instruct all the plurality of Bluetooth gateways 110 to detect unprovisioned Bluetooth devices within their signal coverage areas. For example, in response to deployment and initiation of the mesh network 100, each of the plurality of Bluetooth gateways 110 can individually detect unprovisioned Bluetooth devices within its corresponding signal coverage area. Accordingly, in response to deployment and initiation of the mesh network 100, the user can individually issue a detection instruction to each of the plurality of the Bluetooth gateways 110 in the Bluetooth mesh network 100.

In some embodiments, a user issues a detection instruction individually to one or more of the plurality of Bluetooth gateways 110 in Bluetooth mesh network 100 so as to instruct one or more of the plurality of Bluetooth gateways 110 to detect unprovisioned Bluetooth devices within their respective signal coverage areas. For example, if a user adds a new Bluetooth lamp at a certain location in a home environment, and the Bluetooth devices in other locations remain in their same positions, the user can issue a detection instruction to only the Bluetooth gateway closest to the newly added Bluetooth lamp, thereby triggering that Bluetooth gateway with respect to those (e.g., only those) unprovisioned Bluetooth devices within the signal coverage area of the Bluetooth gateway and thus conserving Bluetooth gateway resources.

In some embodiments, a Bluetooth gateway is configured with a touchscreen. The user can input the detection to the touchscreen (e.g., via selection of a button on a graphical user interface displayed on the touchscreen). In some embodiments, the user inputs the detection instruction by triggering a physical button on the Bluetooth gateway. In some embodiments, the Bluetooth gateway supports speech input, in which case the user can use speech to input a detection instruction to the Bluetooth gateway. For example, the user inputs the detection instruction: "Please begin detection." In some embodiments, the server or other terminal provides a user interface (e.g., a cloud-based interface such as a web site of an app) via which the user can input a detection instruction for one or more Bluetooth gateways. For example, a user interface showing configurations of the Bluetooth mesh network can provide an interface by which a user can select one or more Bluetooth gateways, and can provide the selected one or more Bluetooth gateways with a detection instruction.

In some embodiments, one or more of the plurality of Bluetooth gateways 110 automatically detect unprovisioned Bluetooth devices within their respective coverage area according to a preconfigured detection scheme. For example, a Bluetooth gateway periodically detects unprovisioned Bluetooth devices within its signal coverage area (e.g., according to a predefined detection protocol such as according to a predetermined time). In some embodiments, a Bluetooth gateway starts detection of unprovisioned Bluetooth devices within its signal coverage area at a set detection time (e.g., according to a predetermined schedule, etc.). In some embodiments, a Bluetooth gateway starts detection of unprovisioned Bluetooth devices within its signal coverage area upon detection of a set trigger event. As an example, the trigger event includes a power-on event, an activation event, a user event, or some other event.

In some embodiments, a Bluetooth gateway detects one unprovisioned Bluetooth device or multiple unprovisioned Bluetooth devices within its signal coverage area, or detects no Bluetooth devices at all. A Bluetooth gateway of the plurality of Bluetooth gateways 110 can detect a plurality of unprovisioned Bluetooth devices within its respective signal coverage areas simultaneously. A Bluetooth gateway of the plurality of Bluetooth gateways 110 can detect a plurality of unprovisioned Bluetooth devices within their respective signal coverage areas at different times. In some embodiments, regardless of whether a plurality of Bluetooth gateways detect unprovisioned Bluetooth devices within their respective signal coverage areas at the same time or at different times, the information about the unprovisioned Bluetooth devices that each gateway 110 detects is generally reported to the server 120 at different times. Server 120 accordingly can receive information about detected unprovisioned Bluetooth devices as reported successively by each Bluetooth gateway.

Furthermore, because application scenarios vary, the signal coverage areas of multiple Bluetooth gateways 110 will not overlap in some Bluetooth mesh networks 100, but the signal coverage areas of multiple Bluetooth gateways 110 may overlap in other Bluetooth mesh networks 100. If signal coverage areas of multiple Bluetooth gateways within Bluetooth mesh network 100 overlap, the unprovisioned Bluetooth devices within the overlapped zones can be detected by two or more Bluetooth gateways. Thus, information about a single unprovisioned Bluetooth device will be provided to server 120 by two or more Bluetooth gateways. The server 120 accordingly can receive information at different times about the same unprovisioned Bluetooth device from two or more Bluetooth gateways.

As an example in the context in which a single unprovisioned Bluetooth device is detected by two or more Bluetooth gateways, server 120 provides provisioning data for each unprovisioned Bluetooth device. In this context, server 120 determines one or more Bluetooth gateways that detect the unprovisioned Bluetooth device and then determines a particular Bluetooth gateway (e.g., a target gateway) from among the one or more Bluetooth gateways that detect the unprovisioned Bluetooth device. Server 120 provides the provisioning data of the unprovisioned Bluetooth device to the particular Bluetooth gateway, and thus the particular Bluetooth gateway performs a provisioning operation on the unprovisioned Bluetooth device. Thus, if server 120 receives an indication of a detected unprovisioned Bluetooth device from a plurality of Bluetooth gateways, the server provides the provisioning data for the unprovisioned Bluetooth device to a single Bluetooth gateway. The particular Bluetooth gateway to which server 120 provides the provisioning data is a Bluetooth gateway that detected the unprovisioned Bluetooth device. Other Bluetooth gateways will not receive the provisioning data for the unprovisioned Bluetooth device. Accordingly, a provisioning conflict wherein each of multiple Bluetooth gateways performs a provisioning operation with respect to a same unprovisioned Bluetooth device is avoided.

In some embodiments, server 120 directly provides (e.g., issues) the provisioning data to the particular Bluetooth gateway. In response to the particular Bluetooth gateway receiving the provisioning data, the Bluetooth gateway can determine that a provisioning operation is to be performed with respect to the unprovisioned Bluetooth device based at least in part on the provisioning data. Directly providing the provisioning data to the particular Bluetooth gateway can include providing raw provisioning data to the Bluetooth gateway. In some embodiments, server 120 inserts the provisioning data in a provisioning instruction and provides the provisioning instruction to the particular Bluetooth gateway. In such an approach, in response to the particular Bluetooth gateway receiving the provisioning instruction, the Bluetooth gateway can determine that a provisioning operation is to be performed with respect to the unprovisioned Bluetooth device based at least in part on the provisioning data. The particular Bluetooth gateway can then extract the provisioning data from the provisioning instruction and perform a provisioning operation with respect to the detected unprovisioned Bluetooth device in accordance with the provisioning data. In some embodiments, the provisioning data is inserted into the provisioning instruction according to a predefined protocol, format, and/or template.

According to various embodiments, server 120 receives information pertaining to a single unprovisioned Bluetooth device from a plurality of Bluetooth gateways (e.g., two or more of the plurality of Bluetooth gateways 110). Server 120 can obtain information pertaining to the plurality of Bluetooth gateways that provide the information pertaining to a single unprovisioned Bluetooth device within a certain period of time in connection with identifying the one or more Bluetooth gateways that detected the same unprovisioned Bluetooth device. Server 120 can associate the one or more Bluetooth gateways with a Bluetooth device based at least in part on the information pertaining to a single unprovisioned Bluetooth device and/or information pertaining to the particular Bluetooth gateway(s) that provide the server with the information pertaining to a single unprovisioned Bluetooth device (e.g., the Bluetooth gateways that detected the Bluetooth device).

In some embodiments, with respect to each detected unprovisioned Bluetooth device, server 120 can use a timer (e.g., that is initiated) upon receiving information pertaining to that unprovisioned Bluetooth device as reported from a first Bluetooth gateway. The timer is used in connection with timing a set length of time. Server 120 can wait to receive information pertaining to that unprovisioned Bluetooth device from another Bluetooth gateway during the timing period of the timer. If information pertaining to the unprovisioned Bluetooth device is provided by other Bluetooth gateways during the timing period of the timer (e.g., within a preset period of time), the first Bluetooth gateway and the other Bluetooth gateways will all be deemed as the one or more Bluetooth gateways that detected the unprovisioned Bluetooth device. Server 120 can determine the particular Bluetooth gateway from among the first Bluetooth gateway and the other Bluetooth gateways (e.g., from among the Bluetooth gateways that provided the information pertaining to the unprovisioned device within the preset period of time). If no information pertaining to the unprovisioned Bluetooth device is provided by another Bluetooth gateway during the timing period of the timer, then only the first Bluetooth gateway will be deemed to be the one or more Bluetooth gateways that detected the unprovisioned Bluetooth device. In some embodiments, server 120 deems the first Bluetooth gateway to be the particular Bluetooth gateway. The first Bluetooth gateway can correspond to the Bluetooth gateway that first reported the unprovisioned Bluetooth device information.

According to various embodiments, the length of time timed by the timer is adaptively set according to factors such as the application scenario and user experience. For example, the timer is configurable by the user and/or an application. Provisioning efficiency and/or user experience will suffer if length of time is too long. However, a relatively short length of time can be detrimental with respect to determining other gateways that detect the same unprovisioned Bluetooth device. In some embodiments, the length of time timed by the timer may be set at 1 second, but the length is not limited to this.

Figure 4:
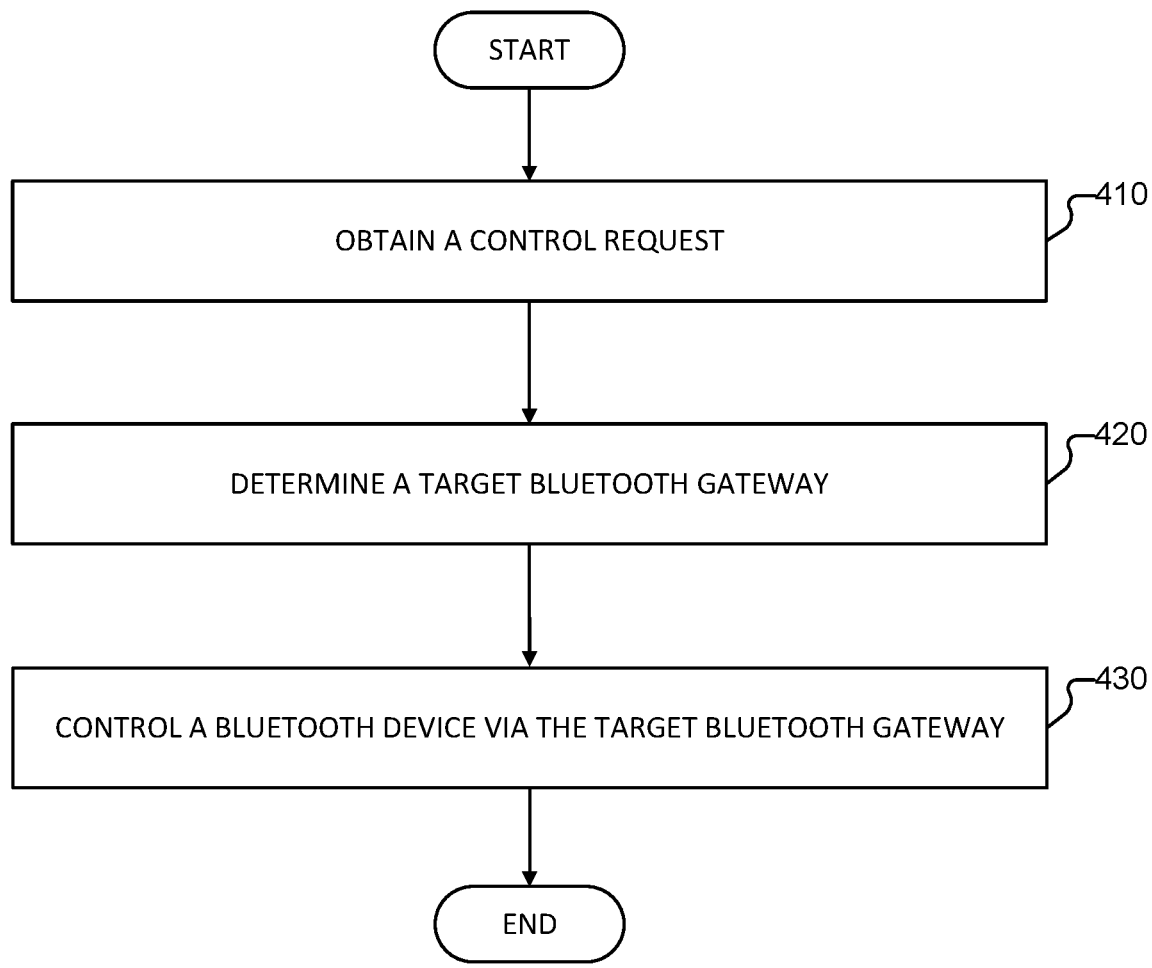
FIG. 4 is a flowchart of a method of Bluetooth mesh network communications according to various embodiments of the present application.

FIG. 4 is a flowchart of a method of Bluetooth mesh network communications according to various embodiments of the present application.

Referring to FIG. 4, process 400 for Bluetooth mesh network communications is provided. Process 400 can be implemented in connection with Bluetooth mesh network 100 of FIG. 1, and/or Bluetooth mesh network 200 of FIG. 2. Process 400 can be implemented in process 300 of FIG. 3 and/or process 500 of FIG. 5. At least part of process 400 can be implemented at least in part by computer system 600 of FIG. 6.

According to various embodiments, process 400 is implemented by a server such as server 120 of FIG. 1.

At 410, a control request is obtained. In some embodiments, the control request is received from one or more Bluetooth gateways connected to a Bluetooth mesh network. A server can receive a control request from a Bluetooth gateway. The control request can correspond to a request to control a Bluetooth device that is connected to the Bluetooth mesh network. The control request can be input by a user. In some embodiments, the control request comprises an indication of the to-be-controlled Bluetooth device. In some embodiments, the to-be-controlled Bluetooth device is determined based at least in part on the control request.

At 420, a target Bluetooth gateway is determined. In some embodiments, in response to obtaining the control request, a target Bluetooth gateway is determined. The target Bluetooth gateway can correspond to a Bluetooth gateway that is connected to the Bluetooth mesh network to which the to-be-controlled Bluetooth device is connected. The target Bluetooth gateway can be determined based at least in part on the control request and/or a mapping of Bluetooth gateways to Bluetooth devices. In some embodiments, the target Bluetooth gateway corresponds to the Bluetooth gateway via which the server controls the to-be-controlled Bluetooth device (e.g., in accordance with the control request). The target Bluetooth gateway can comprise a subset of all Bluetooth gateways within the Bluetooth mesh network. In some embodiments, the target Bluetooth gateway comprises all Bluetooth gateways within the Bluetooth mesh network. For example, the control instruction (or control request) can be provided or broadcast to all Bluetooth devices within the Bluetooth mesh network.

At 430, a Bluetooth device is controlled via the target Bluetooth gateway. In some embodiments, the server controls the Bluetooth device (e.g., the to-be-controlled Bluetooth device) via the target Bluetooth gateway. The server can control the Bluetooth device based at least in part on the control request. For example, the control of the Bluetooth device can comprise changing a setting or a configuration of the Bluetooth device. In some embodiments, controlling the Bluetooth device comprises communicating the control request and/or a control instruction to the target Bluetooth gateway and/or the to-be-controlled Bluetooth device.

In some embodiments, control with respect to the to-be-controlled Bluetooth device can be implemented based on the control request. Control over the to-be-controlled Bluetooth device can be implemented via at least one Bluetooth gateway among the plurality of Bluetooth gateways comprised in the Bluetooth mesh network. In some embodiments, controlling the to-be-controlled Bluetooth device comprises sending the control request to the plurality of Bluetooth gateways. In turn, the plurality of Bluetooth gateways can exert control over the to-be-controlled Bluetooth device based on the control request.

In some embodiments, controlling the to-be-controlled Bluetooth device based on the control request via at least one Bluetooth gateway among the plurality of Bluetooth gateways included in the Bluetooth mesh network comprises: determining a target Bluetooth gateway from among the plurality of Bluetooth gateways included in the Bluetooth mesh network and implementing control over the to-be-controlled Bluetooth device based on the control request via the target Bluetooth gateway.

In some embodiments, determining the target Bluetooth gateway from among the plurality of Bluetooth gateways within the Bluetooth mesh network comprises: determining the to-be-controlled Bluetooth device based at least in part on an identifier of the to-be-controlled Bluetooth device included in the control request, and selecting a Bluetooth gateway having a signal range sufficient to cover the to-be-controlled Bluetooth device from among the plurality of Bluetooth gateways to serve as the target Bluetooth gateway.

In some embodiments, selecting a Bluetooth gateway having a signal range sufficient to cover the to-be-controlled Bluetooth device from among the plurality of Bluetooth gateways to serve as the target Bluetooth gateway comprises: using the positional relationships of the plurality of Bluetooth gateways to the to-be-controlled Bluetooth device as a basis to select from among the plurality of Bluetooth gateways the Bluetooth gateway having a distance from the to-be-controlled Bluetooth device that satisfies a set distance condition to serve as the target Bluetooth gateway. In some embodiments, selecting the Bluetooth gateway to serve as the target Bluetooth gateway comprises determining from among the multiple Bluetooth gateways a Bluetooth gateway having a historical record of communications with the to-be-controlled Bluetooth device to serve as the target Bluetooth gateway.

In some embodiments, controlling the to-be-controlled Bluetooth device based on the control request via the target Bluetooth gateway comprises: sending the control request to the target Bluetooth gateway so that the target Bluetooth gateway can exercise control based on the control request over the to-be-controlled Bluetooth device.

In some embodiments, the control request corresponds to a voice request, and sending the control request to the target Bluetooth gateway so that the target Bluetooth gateway can exercise control over the to-be-controlled Bluetooth device comprises: converting the voice request on the basis of speech recognition technology into a text instruction, and sending the text instruction to the target Bluetooth gateway so that the target Bluetooth gateway can perform intent analysis based on the text instruction to obtain the control intent and control the to-be-controlled Bluetooth device according to the control intent.

In some embodiments, controlling the to-be-controlled Bluetooth device based on the control request via the target Bluetooth gateway comprises: performing an intent analysis with respect to the control request to obtain the control intent, and sending the control intent to the target Bluetooth gateway so that the target Bluetooth gateway can exercise control over the to-be-controlled Bluetooth device.

In some embodiments, the control request (e.g., the control request input by the user) in the Bluetooth mesh network is submitted to the server. The server selects a Bluetooth gateway for the control request in order to implement control over the to-be-controlled device corresponding to the control request. The use of a server to select a Bluetooth gateway to implement control over the to-be-controlled device solves the communication problem in Bluetooth mesh networks comprising multiple Bluetooth gateways. Accordingly, implementing a Bluetooth mesh network comprising multiple Bluetooth gateways is possible. With the above approach, the use of a plurality of Bluetooth gateways within a Bluetooth mesh network can therefore cover (e.g., include) even more Bluetooth devices. The Bluetooth mesh network according to various embodiments solves (or at least improves) the defect of communication dead spots caused by constraints on the Bluetooth mesh network coverage range.

Figure 5:
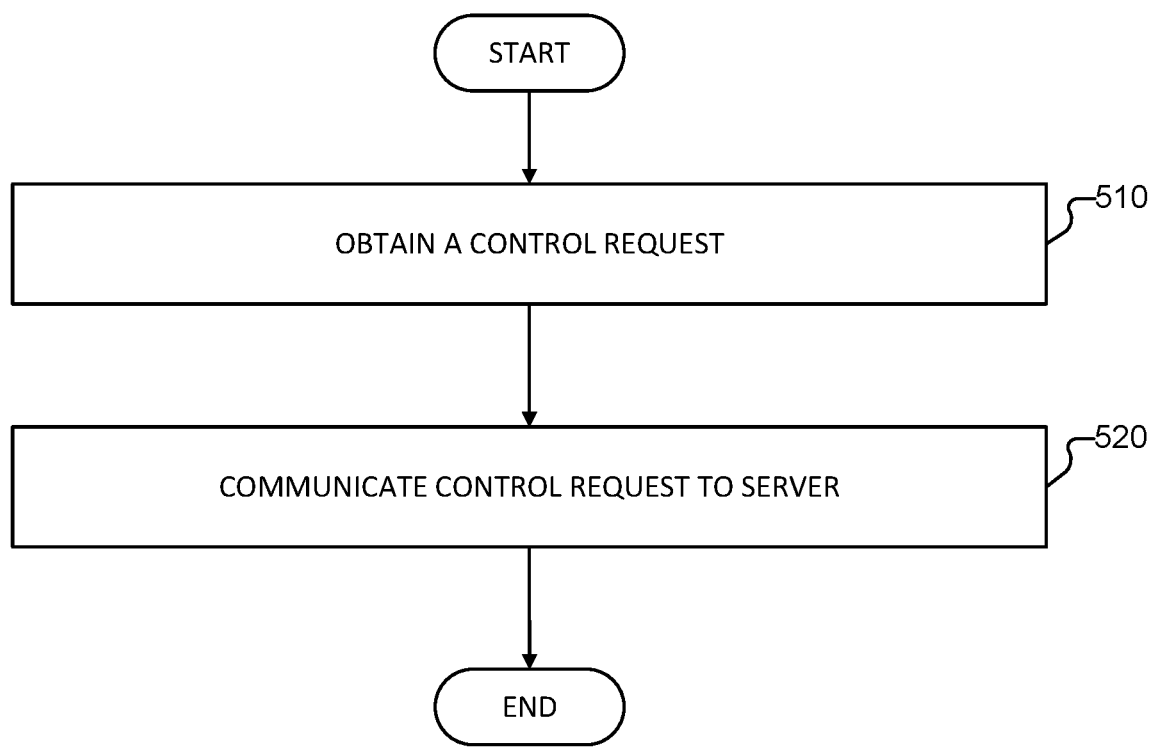
FIG. 5 is a flowchart of a method of Bluetooth mesh network communications according to various embodiments of the present application.

FIG. 5 is a flowchart of a method of Bluetooth mesh network communications according to various embodiments of the present application.

Referring to FIG. 5, process 500 for Bluetooth mesh network communications is provided. Process 500 can be implemented in connection with Bluetooth mesh network 100 of FIG. 1, and/or Bluetooth mesh network 200 of FIG. 2. Process 500 can be implemented in process 300 of FIG. 3 and/or process 400 of FIG. 4. At least part of process 500 can be implemented at least in part by computer system 600 of FIG. 6.

According to various embodiments, process 500 is implemented by at least one Bluetooth gateway of a Bluetooth mesh network. For example, process 500 is implemented at least in part by at least one of the plurality of Bluetooth gateways 110 of FIG. 1.

At 510, a control request is obtained. In some embodiments, a Bluetooth gateway receives a control request. The control request can be provided by a user. For example, the control request can be input by a user to the Bluetooth gateway or to a Bluetooth device connected to the Bluetooth gateway. The control request can correspond to a request to control (e.g., perform one or more functions) with respect to a to-be-controlled Bluetooth device.

At 520, the control request is communicated to a server. In some embodiments, in response to receiving the control request, the Bluetooth gateway provides the control request to the server connected to the Bluetooth mesh network. The Bluetooth gateway provides the control request to the server in connection with controlling the to-be-controlled Bluetooth device via at least one Bluetooth gateway among the plurality of Bluetooth gateways contained in the Bluetooth mesh network.

In some embodiments, if the Bluetooth gateway that submits the control request to the server is the Bluetooth gateway used to control the to-be-controlled Bluetooth device, the Bluetooth gateway receives a control request (or a control instruction corresponding to the control request) sent by the server and implements control based on the control request (or a control instruction) over the to-be-controlled Bluetooth device.

In some embodiments, the plurality of Bluetooth gateways in the Bluetooth mesh network receive a control request (e.g., from a user) and provide the control request to the server. In some embodiments, one or more of the plurality of Bluetooth gateways control the to-be-controlled Bluetooth device. A Bluetooth mesh network comprising the plurality of Bluetooth gateways cooperating with the server can effectively extend the communication coverage range of the Bluetooth mesh network (e.g., the distances between different Bluetooth gateways can be extended).

Please note that the executing entity for each step in the method provided by the above embodiment may be the same device, or different devices may serve as the executing entity for the method.

In addition, some of the processes described in the above embodiments and drawings contain multiple operations which appear according to a specific sequence. However, one must understand fully that these operations may be executed according to a sequence other than the one that appears in the text or may be executed in parallel. Operation sequence numbers such as 410 and 420 merely serve to differentiate the different operations from each other. The sequence numbers themselves do not represent any sequence of execution. In addition, these processes may include more or fewer operations, and these operations may be executed sequentially or in parallel. Please note that the descriptors "first," "second," and so on are for differentiating different messages, devices, modules, and so on and do not represent a sequence, nor do "first" and "second" limit them to different types.

Figure 6:
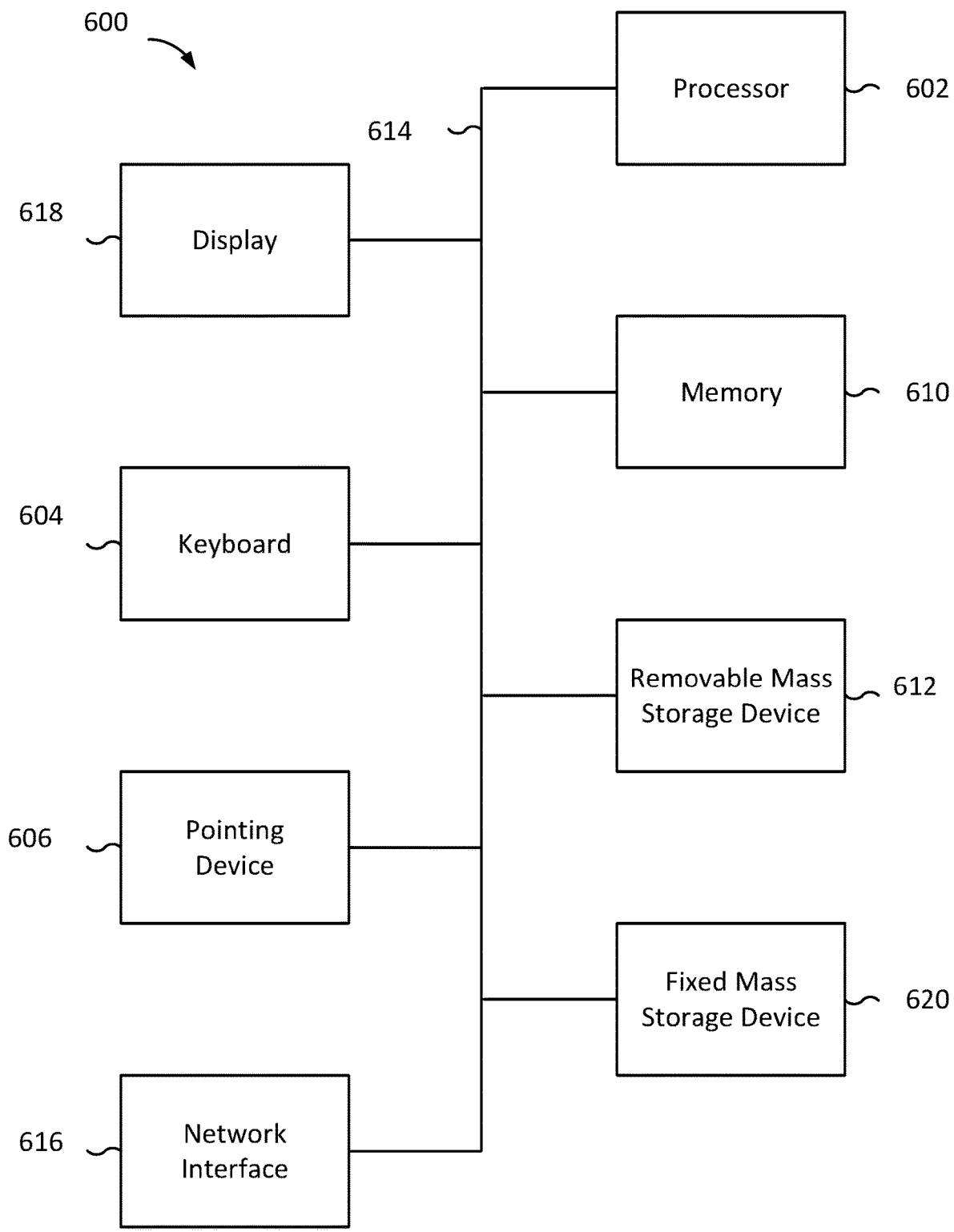
FIG. 6 is a functional diagram of a computer system for communication according to various embodiments of the present application.

FIG. 6 is a functional diagram of a computer system for communication according to various embodiments of the present application.

Referring to FIG. 6, computer system 600 is provided. Computer system 600 can be implemented in connection with Bluetooth mesh network 100 of FIG. 1 and/or Bluetooth mesh network 200 of FIG. 2. In some embodiments, a Bluetooth mesh network (e.g., Bluetooth mesh network 100 of FIG. 1 and/or Bluetooth mesh network 200 of FIG. 2) comprises a plurality of computers systems (e.g., a plurality of computer systems 600) and one or more of the Bluetooth gateway, Bluetooth device, and server are respectively implemented by at least one computer system. Computer system 600 can implement at least part of process 300 of FIG. 3, process 400 of FIG. 4, and/or process 500 of FIG. 5.

Processor 602 is coupled bi-directionally with memory 610, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 602. Also as is well known in the art, primary storage typically includes basic operating instructions, program code, data, and objects used by the processor 602 to perform its functions (e.g., programmed instructions). For example, memory 610 can include any suitable computer-readable storage media, described below, depending on whether, for example, data access needs to be bi-directional or uni-directional. For example, processor 602 can also directly and very rapidly retrieve and store frequently needed data in a cache memory (not shown). The memory can be a non-transitory computer-readable storage medium.

A removable mass storage device 612 provides additional data storage capacity for the computer system 600, and is coupled either bi-directionally (read/write) or uni-directionally (read only) to processor 602. For example, storage 612 can also include computer-readable media such as magnetic tape, flash memory, PC-CARDS, portable mass storage devices, holographic storage devices, and other storage devices. A fixed mass storage 620 can also, for example, provide additional data storage capacity. The most common example of mass storage 620 is a hard disk drive. Mass storage device 612 and fixed mass storage 620 generally store additional programming instructions, data, and the like that typically are not in active use by the processor 602. It will be appreciated that the information retained within mass storage device 612 and fixed mass storage 620 can be incorporated, if needed, in standard fashion as part of memory 610 (e.g., RAM) as virtual memory.

In addition to providing processor 602 access to storage subsystems, bus 614 can also be used to provide access to other subsystems and devices. As shown, these can include a display monitor 618, a network interface 616, a keyboard 604, and a pointing device 606, as well as an auxiliary input/output device interface, a sound card, speakers, and other subsystems as needed. For example, the pointing device 606 can be a mouse, stylus, track ball, or tablet, and is useful for interacting with a graphical user interface.

The network interface 616 allows processor 602 to be coupled to another computer, computer network, or telecommunications network using a network connection as shown. For example, through the network interface 616, the processor 602 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 602 can be used to connect the computer system 600 to an external network and transfer data according to standard protocols. For example, various process embodiments disclosed herein can be executed on processor 602, or can be performed across a network such as the Internet, intranet networks, or local area networks, in conjunction with a remote processor that shares a portion of the processing. Additional mass storage devices (not shown) can also be connected to processor 602 through network interface 616.

An auxiliary I/O device interface (not shown) can be used in conjunction with computer system 600. The auxiliary I/O device interface can include general and customized interfaces that allow the processor 602 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 6 is but an example of a computer system suitable for use with the various embodiments disclosed herein. Other computer systems suitable for such use can include additional or fewer subsystems. In addition, bus 614 is illustrative of any interconnection scheme serving to link the subsystems. Other computer architectures having different configurations of subsystems can also be utilized.

The systems, means, modules, or units illustrated by the above embodiments specifically may be implemented by computer chips or entities or by products having certain functions. A typical implementing device is a computer. The particular form a computer may take may be a personal computer, laptop computer, cellular phone, camera phone, smart phone, personal digital assistant, media player, navigation device, email receiving device, game console, tablet computer, wearable device, or a combination of any of these devices.

In a typical configuration, a computer comprises one or more processors (CPUs), input/output ports, network interfaces, and memory.

Memory may include the following forms in computer-readable media: volatile memory, random access memory (RAM), and/or non-volatile memory, e.g., read-only memory (ROM) or flash RAM. Memory is an example of a computer-readable medium.

According to various embodiments, a Bluetooth mesh network is provided in which a control request obtained from a user is provided to the server. The server selects a suitable Bluetooth gateway for the control request with respect to implementing control over the to-be-controlled device. Various embodiments solve the communication problem in Bluetooth mesh networks comprising multiple Bluetooth gateways. As a result, implementing a Bluetooth mesh network comprising multiple Bluetooth gateways is possible. With the above approach, the use of a plurality of Bluetooth gateways can therefore cover even more Bluetooth devices. Various embodiments solve (or at least improve) the defect of communication dead spots caused by constraints on the Bluetooth mesh network coverage range.

Accordingly, various embodiments further provide a computer-readable medium storing computer programs. When executed, the computer programs are capable of implementing all the steps executable by a server in the method embodiments described above.

The memory in FIG. 6 may take the form of any type of volatile or non-volatile storage device or combination thereof. Examples include static random access memory (SRAM), electrically erasable programmable read-only memory (EEPROM), erasable programmable read-only memory (EPROM), programmable read-only memory (PROM), read-only memory (ROM), magnetic memory, flash memory, magnetic disks, and optical disks.

Computer system 600 of FIG. 6 can include a communication component that is configured to facilitate wired or wireless communication between the device on which the communication component is located and other devices. The device where the communication component is located may access wireless networks based on a communications standard such as Wi-Fi, 2G, 3G, or a combination thereof. In an exemplary embodiment, the communication component receives via broadcast channels broadcast signals or broadcast-related information from external broadcast management systems. In an exemplary embodiment, said communication component further comprises a near-field communication module for promoting short-range communication. For example, it can be achieved in the NFC module on the basis of radio-frequency identification (RFID) technology, Infrared Data Association (IrDA) technology, ultra-wide band (UWB) technology, Bluetooth (BT) technology, and other technology.

Display 618 in FIG. 6 above includes a screen, and the screen may include a liquid crystal display (LCD) or a touch panel (TP). If the screen comprises a touch panel, the screen may be implemented as a touchscreen to receive input signals from the user. The touch panel comprises one or more touch sensors to detect touch, sliding actions, and gestures on the touch panel. Said touch sensor can not only detect the boundaries of touch or slide actions, but also measure the duration and pressure related to said touch or slide operations.

Computer system 600 of FIG. 6 can include a power supply component that is configured to provide electric power to all components in the device where the power supply component is located. The power supply component may include a power supply management system, one or more power supplies, and other components related to generating, managing, and allocating power to the device where the power supply component is located.

A person skilled in the art should understand that the embodiments of the present invention can be provided as methods, systems or computer program products. Therefore, the present invention may take the form of complete hardware embodiments, complete software embodiments, or embodiments that combine software and hardware. Moreover, the present invention may take the form of computer program products implemented on one or more computer-operable storage media (including but not limited to magnetic disk storage, CD-ROMs, and optical storage) containing computer-operable program code.

The present invention is described with reference to flow charts and/or block diagrams based on methods, equipment (systems) and computer program products of the present invention. Please note that each process and/or block within the flowcharts and/or block diagrams and combinations of processes and/or blocks within the flowcharts and/or block diagrams can be implemented by computer instructions. These computer program instructions can be provided to general-purpose computers, special-purpose computers, embedded processors, or processors of other data-processing devices to give rise to a machine such that the instructions by the computers or by the processors of other programmable data-processing devices give rise to devices used to implement the functions specified in one or more processes in a flowchart and/or in one or more blocks in a block diagram.

These computer program instructions can also be stored in computer-readable memory that can guide computers or other programmable data-processing devices to operate according to specific modes, with the result that the instructions stored in this computer-readable memory give rise to products that include command means. These command means implement the functions specified in one or more processes in a flow chart and/or one or more blocks in a block diagram.

These computer program instructions can also be loaded onto a computer or other programmable data-processing device, with the result that a series of operating steps are executed on a computer or other programmable device so as to give rise to computer processing. In this way, the instructions executed on a computer or other programmable device provide steps for implementing the functions specified by one or more processes in a flow chart and/or one or more blocks in a block diagram.

In a typical configuration, a computer device comprises one or more processors (CPUs), input/output ports, network interfaces, and memory.

Memory may include the following forms in computer-readable media: volatile memory, random-access memory (RAM), and/or non-volatile memory, e.g., read-only memory (ROM) or flash RAM. Memory is an example of a computer-readable medium.

Computer-readable media, including permanent and non-permanent and removable and non-removable media, may achieve information storage by any method or technology. The information may be computer-readable instructions, data structures, program modules, or other data. Examples of computer storage media include but are not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digit multifunction disc (DVD) or other optical storage, magnetic cassettes, magnetic tape or magnetic disc storage, or other magnetic storage equipment or any other non-transmission media that can be used to store information that is accessible to computers. In accordance with the definitions in this document, computer-readable media do not include transitory computer-readable media (transitory media) such as modulated data signals and carrier waves.

Please also note that the term "comprise" or "contain" or any of their variants are to be taken in their non-exclusive sense. Thus, processes, methods, merchandise, or devices that comprise a series of elements comprise not only those elements, but also other elements that have not been explicitly listed or those that are intrinsic to such processes, methods, merchandise, or devices. In the absence of further limitations, elements that are limited by the phrase "comprises a(n) . . . " do not exclude the existence of additional identical elements in the processes, methods, merchandise, or devices that comprise said elements.

The above-stated are merely embodiments of the present application and do not limit the present application. For a person skilled in the art, there may be various modifications and alterations of the present application. Any revision, equivalent substitution, or improvement done within the spirit and principles of the present application shall be included within the scope of claims of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A Bluetooth mesh network, comprising:
a server;
a plurality of Bluetooth gateways; and
a plurality of Bluetooth devices,
wherein:
the plurality of Bluetooth gateways are configured to receive a control request with respect to controlling a to-be-controlled Bluetooth device among the plurality of Bluetooth devices, and to communicate the control request to the server in response to receiving the control request; and
the server is configured to:
receive the control request from at least a first of the plurality of Bluetooth devices;
determine at least one of the plurality of Bluetooth gateways via which the to-be controlled Bluetooth device is to be controlled, comprising:
determining the to-be-controlled Bluetooth device based at least in part on a type of instruction corresponding to the control request and a mapping of types of instructions to to-be controlled Bluetooth devices; and
selecting the at least one of the plurality of Bluetooth gateways via which the to-be controlled Bluetooth device is to be controlled in response to a determination, based at least in part on the historical information, that the at least one of the plurality of Bluetooth gateways having a greatest amount of historical communication with the to-be controlled Bluetooth device; and
control the to-be-controlled Bluetooth device via at least one Bluetooth gateway of the plurality of Bluetooth gateways, wherein the server controls the to-be-controlled Bluetooth device based at least in part on the control request.

2. The Bluetooth mesh network of claim 1, wherein the server is further configured to send the control request to the plurality of Bluetooth gateways in connection with controlling the to-be-controlled Bluetooth device based at least in part on the control request.

3. The Bluetooth mesh network of claim 1, wherein:
to determine the at least one of the plurality of Bluetooth gateways via which the to-be controlled Bluetooth device is to be controlled comprises selecting a target Bluetooth gateway from among the plurality of Bluetooth gateways with which to control the to-be-controlled Bluetooth device, the target Bluetooth gateway being selected based at least in part on whether a signal range of the Bluetooth gateway covers the to-be-controlled Bluetooth device.

4. The Bluetooth mesh network of claim 1, wherein the server is further configured to:
send the control request to the at least one of the plurality of Bluetooth gateways in connection with the at least one of the plurality of Bluetooth gateways controlling the to-be-controlled Bluetooth device based at least in part on the control request.

5. The Bluetooth mesh network of claim 4, wherein:
the control request is a voice request;
the server is further configured to:
convert the voice request to a text instruction; and
send the text instruction to at least one of the plurality of Bluetooth gateways; and
the at least one of the plurality of Bluetooth gateways is further configured to perform an intent analysis based at least in part on the text instruction to obtain a control intent, and to control the to-be-controlled Bluetooth device based at least in part on the control intent.

6. The Bluetooth mesh network of claim 1, wherein the server is further configured to:
perform an intent analysis with respect to the control request to obtain a control intent; and
send the control intent to the at least one of the plurality of Bluetooth gateways in connection with at least one of the plurality of Bluetooth gateways controlling the to-be-controlled Bluetooth device.

7. The Bluetooth mesh network of claim 1, wherein the plurality of Bluetooth gateways communicate with the server using a non-Bluetooth mode of communication, and a communication distance of the non-Bluetooth mode of communication is greater than a communication distance of a Bluetooth mode of communication.

8. The Bluetooth mesh network of claim 1, wherein:
the to-be-controlled Bluetooth device is configured to provide to at least one Bluetooth gateway a current status of the to-be-controlled Bluetooth device; and
the at least one Bluetooth gateway is further configured to receive an indication of the current status of the to-be-controlled Bluetooth device, and to communicate the indication of the current status of the to-be-controlled Bluetooth device to the server.

9. The Bluetooth mesh network of claim 1, wherein the Bluetooth gateway corresponding to a Bluetooth device that received the control request is different from the at least one Bluetooth gateway via which the to-be-controlled Bluetooth device is controlled.

10. The Bluetooth mesh network of claim 1, wherein selection of the at least one of the plurality of Bluetooth gateways via which the to-be controlled Bluetooth device is to be controls is further based on determination that a number of times the at least one of the plurality of Bluetooth gateways communicated with the to-be controlled Bluetooth device exceeds a threshold number of times.

11. A method, comprising:
receiving, by one or more processors associated with a server connected to a Bluetooth mesh network, a control request, wherein the control request is sent to the server by at least one Bluetooth gateway, and the at least one Bluetooth gateway is connected to the Bluetooth mesh network that received the control request, and the control request corresponds to a request to control a to-be-controlled Bluetooth device;
determining, by the one or more processors associated with the server, at least one of a plurality of Bluetooth gateways via which the to-be controlled Bluetooth device is to be controlled, comprising:
determining the to-be-controlled Bluetooth device based at least in part on a type of instruction corresponding to the control request and a mapping of types of instructions to to-be controlled Bluetooth devices; and
selecting the at least one of the plurality of Bluetooth gateways via which the to-be controlled Bluetooth device is to be controlled in response to a determination, based at least in part on the historical information, that the at least one of the plurality of Bluetooth gateways having a greatest amount of historical communication with the to-be controlled Bluetooth device; and
controlling, by one or more processors, the to-be-controlled Bluetooth device via the at least one of the plurality of Bluetooth gateways, the to-be-controlled Bluetooth device being controlled based at least in part on the control request.

12. The method of claim 11, wherein controlling the to-be-controlled Bluetooth device via at the least one Bluetooth gateway comprises:
communicating the control request to the plurality of Bluetooth gateways, wherein the plurality of Bluetooth gateways control the to-be-controlled Bluetooth device based at least in part on the control request.

13. The method of claim 11, wherein:
determining the at least one of the plurality of Bluetooth gateways via which the to-be controlled Bluetooth device is to be controlled comprises selecting a target Bluetooth gateway from among the plurality of Bluetooth gateways with which to control the to-be-controlled Bluetooth device, the target Bluetooth gateway being selected based at least in part on whether a signal range of the Bluetooth gateway covers the to-be-controlled Bluetooth device.

14. The method of claim 11, wherein the controlling the to-be-controlled Bluetooth device via the at least one of the plurality of Bluetooth gateways comprises:
sending the control request to the at least one of the plurality of Bluetooth gateways in connection with the controlling the to-be-controlled Bluetooth device based at least in part on the control request.

15. The method of claim 14, wherein:
the control request is a voice request; and
the sending the control request to the at least one of the plurality of Bluetooth gateways in connection with at least one of the plurality of Bluetooth gateways controlling the to-be-controlled Bluetooth device based at least in part on the control request comprises:
converting the voice request to a text instruction; and
sending the text instruction to the at least one of the plurality of Bluetooth gateways, the at least one of the plurality of Bluetooth gateways performing an intent analysis based at least in part on the text instruction to obtain a control intent, and controlling the to-be-controlled Bluetooth device based at least in part on the control intent.

16. The method of claim 11, wherein the controlling the to-be-controlled Bluetooth device comprises:
performing intent analysis with respect to the control request to obtain a control intent; and
sending the control intent to the at least one of the plurality of Bluetooth gateways in connection with the at least one of the plurality of Bluetooth gateways controlling to-be-controlled Bluetooth device.

17. A method, comprises:
receiving, by one or more processors associated with a Bluetooth gateway connected to a Bluetooth mesh network, a control request, the control request corresponding to a request to control a to-be-controlled Bluetooth device; and
communicating, by one or more processors, the control request to a server connected to the Bluetooth mesh network, wherein:
the server controls the to-be-controlled Bluetooth device via at least one Bluetooth gateway among a plurality of Bluetooth gateways connected to the Bluetooth mesh network;
the server determines the at least one of the plurality of Bluetooth gateways via which the to-be controlled Bluetooth device is to be controlled, wherein determining the at least one of the plurality of Bluetooth gateways via which the to-be controlled Bluetooth device is to be controlled comprises:
determining the to-be-controlled Bluetooth device based at least in part on a type of instruction corresponding to the control request and a mapping of types of instructions to to-be controlled Bluetooth devices; and
selecting the at least one of the plurality of Bluetooth gateways via which the to-be controlled Bluetooth device is to be controlled in response to a determination, based at least in part on the historical information, that the at least one of the plurality of Bluetooth gateways having a greatest amount of historical communication with the to-be controlled Bluetooth device; and
the server controlling the to-be-controlled Bluetooth device based at least in part on the control request.

18. The method of claim 17, further comprising:
receiving, by the one or more processors, the control request communicated by the server; and
controlling the to-be-controlled Bluetooth device based on the control request.

19. A server connected to a Bluetooth mesh network, the server comprising:
one or more processors configured to:
receive a control request, wherein the control request is sent to the server by at least one Bluetooth gateway, and the at least one Bluetooth gateway is connected to the Bluetooth mesh network that received the control request, and the control request corresponds to a request to control a to-be-controlled Bluetooth device;
determine the at least one of a plurality of Bluetooth gateways via which the to-be controlled Bluetooth device is to be controlled, to determine the at least one of the plurality of Bluetooth gateways comprising:
determining the to-be-controlled Bluetooth device based at least in part on a type of instruction corresponding to the control request and a mapping of types of instructions to to-be controlled Bluetooth devices; and
selecting the at least one of the plurality of Bluetooth gateways via which the to-be controlled Bluetooth device is to be controlled in response to a determination, based at least in part on the historical information, that the at least one of the plurality of Bluetooth gateways having a greatest amount of historical communication with the to-be controlled Bluetooth device; and
control the to-be-controlled Bluetooth device via one or more Bluetooth gateways among a plurality of Bluetooth gateways connected to the Bluetooth mesh network, the to-be-controlled Bluetooth device being controlled based at least in part on the control request; and
one or more memories coupled to the one or more processors, configured to provide the one or more processors with instructions.

20. A computer program product, the computer program product being embodied in a non-transitory computer readable storage medium and comprising computer instructions for:
receiving, by one or more processors associated with a server connected to a Bluetooth mesh network, a control request, wherein the control request is sent to the server by at least one Bluetooth gateway, and the at least one Bluetooth gateway is connected to the Bluetooth mesh network that received the control request, and the control request corresponds to a request to control a to-be-controlled Bluetooth device;
determining the at least one of a plurality of Bluetooth gateways via which the to-be controlled Bluetooth device is to be controlled, comprising:
determining the to-be-controlled Bluetooth device based at least in part on a type of instruction corresponding to the control request and a mapping of types of instructions to to-be controlled Bluetooth devices; and
selecting the at least one of the plurality of Bluetooth gateways via which the to-be controlled Bluetooth device is to be controlled in response to a determination, based at least in part on the historical information, that the at least one of the plurality of Bluetooth gateways having a greatest amount of historical communication with the to-be controlled Bluetooth device; and
controlling, by one or more processors, the to-be-controlled Bluetooth device via one or more Bluetooth gateways among a plurality of Bluetooth gateways connected to the Bluetooth mesh network, the to-be-controlled Bluetooth device being controlled based at least in part on the control request.

21. A Bluetooth gateway connected to a Bluetooth mesh network, the Bluetooth gateway comprising:
one or more processors configured to:
receive a control request, the control request corresponding to a request to control a to-be-controlled Bluetooth device; and
communicate the control request to a server connected to the Bluetooth mesh network, wherein:
the server controls the to-be-controlled Bluetooth device via at least one Bluetooth gateway among a plurality of Bluetooth gateways connected to the Bluetooth mesh network;

the server determines the at least one of the plurality of Bluetooth gateways via which the to-be controlled Bluetooth device is to be controlled, wherein determining the at least one of the plurality of Bluetooth gateways comprising:

determining the to-be-controlled Bluetooth device based at least in part on a type of instruction corresponding to the control request and a mapping of types of instructions to to-be controlled Bluetooth devices; and selecting the at least one of the plurality of Bluetooth gateways via which the to-be controlled Bluetooth device is to be controls in response to a determination, based at least in part on the historical information, that the at least one of the plurality of Bluetooth gateways having a greatest amount of historical communication with the to-be controlled Bluetooth device; and the server controlling the to-be-controlled Bluetooth device based at least in part on the control request; and one or more memories coupled to the one or more processors, configured to provide the one or more processors with instructions.

22. A computer program product, the computer program product being embodied in a non-transitory computer readable storage medium and comprising computer instructions for:

receiving, by one or more processors associated with a Bluetooth gateway connected to a Bluetooth mesh network, a control request, the control request corresponding to a request to control a to-be-controlled Bluetooth device; and communicating, by one or more processors, the control request to a server connected to the Bluetooth mesh network, wherein:

the server controls the to-be-controlled Bluetooth device via at least one Bluetooth gateway among a plurality of Bluetooth gateways connected to the Bluetooth mesh network;

the server determines the at least one of the plurality of Bluetooth gateways via which the to-be controlled Bluetooth device is to be controlled, wherein determining the at least one of the plurality of Bluetooth gateways comprising:

determining the to-be-controlled Bluetooth device based at least in part on a type of instruction corresponding to the control request and a mapping of types of instructions to to-be controlled Bluetooth devices; and selecting the at least one of the plurality of Bluetooth gateways via which the to-be controlled Bluetooth device is to be controlled in response to a determination, based at least in part on the historical information, that the at least one of the plurality of Bluetooth gateways having a greatest amount of historical communication with the to-be controlled Bluetooth device; and the server controlling the to-be-controlled Bluetooth device based at least in part on the control request.

* * * * *